United States Patent [19]
Spellman et al.

[11] Patent Number: 5,917,485
[45] Date of Patent: Jun. 29, 1999

[54] USER ASSISTANCE FOR DATA PROCESSING SYSTEMS

[75] Inventors: Cynthia E. Spellman, St. Paul; Grant T. Nelson, Wyoming; Barry F. Ruzek, Shoreview; Gary L. Lien, Brooklyn Park, all of Minn.

[73] Assignee: Unisys Corporation, Blue Bell, Pa.

[21] Appl. No.: 08/852,509

[22] Filed: May 7, 1997

[51] Int. Cl.$^6$ .................................................. G06F 3/00
[52] U.S. Cl. .................................................. 345/336
[58] Field of Search ........................... 345/336, 337, 345/338; 395/680

[56] References Cited

U.S. PATENT DOCUMENTS

| | | | |
|---|---|---|---|
| 5,434,963 | 7/1995 | Kuwamoto et al. | 345/338 |
| 5,535,323 | 7/1996 | Miller et al. | 345/338 |
| 5,581,670 | 12/1996 | Bier et al. | 395/326 |
| 5,581,684 | 12/1996 | Dudzik et al. | 395/338 |
| 5,581,686 | 12/1996 | Koppolu et al. | 395/340 |
| 5,584,035 | 12/1996 | Duggan et al. | 395/800 |

OTHER PUBLICATIONS

"Off to see the Wizard," Midrange Systems, V7, Nov. 17, 1994. p. 44(1).

Microsoft Word for Windows 95, Version 7.0, Copyright 1983–1995 Microsoft Corporation.

Micron Help, Version 1.1G, Copyright 1996, Micron Electronics, Inc.

Microsoft Windows 95, Copyright 1981–1995, Microsoft Corporation.

*Primary Examiner*—A. Katbab
*Attorney, Agent, or Firm*—Charles A. Johnson; Mark T. Starr; Nawrocki, Rooney & Sivertson, P.A.

[57] ABSTRACT

A system and methodology for implementing user assistance functions concerning interoperability of diverse applications, whether hosted on the same computer platform or hosted on different computer platforms. The user is assisted by being offered information, tools and/or automation as appropriate to the problem presented. As appropriate, graphics or animation is utilized to permit complete and full understanding by the user of the assistance being provided.

14 Claims, 27 Drawing Sheets

USER ASSISTANCE FOR DATA PROCESSING SYSTEMS

CROSS REFERENCE TO CO-PENDING APPLICATIONS

This invention is related to commonly assigned, co-pending U.S. patent application Ser. No. 08/852,507, entitled "USER ASSISTANCE FOR HETEROGENEOUS DATA PROCESSING SYSTEMS", filed on even date and incorporated herein by reference.

BACKGROUND OF THE INVENTION

1. Field of the Invention

The present invention relates generally to data processing systems and more particularly relates to data processing systems having user assistance resources.

2. Description of the Prior Art

It is known to provide documentation for the purpose of permitting a user to operate a data processing system. With the earliest data processing systems, this documentation took the form of user manuals which described the operation and utilization of the corresponding data processing system.

As systems were designed to be more interactive, it became common to provide user documentation within the data processing system hardware and software itself. In the simplest concept, this may take the form of "OFF" and "ON" designations on the power switch. In a far more complex form indicative of the current state of the art, commercial operating systems such as Windows 95 provide "HELP" capabilities in addition to the normal user manual.

A typical user interface may be seen in U.S. Pat. No. 5,581,686, issued to Koppolu et al., and incorporated herein by reference. This user interface provides opportunity for the user to enter data into the running program.

A rudimentary method of using animation for augmenting the help function may be seen in U.S. Pat. No. 5,584,035, issued to Duggan et al., and incorporated herein by reference. Animation can be helpful in showing a user in pictorial form, concepts which are difficult to describe verbally.

Whereas it is often helpful to provide the information associated with the help function to the user, in certain instances it may be even more helpful to provide tool programs to enable the user to directly act upon help information. U.S. Pat. No. 5,581,670, issued to Bier et al., and incorporated herein by reference, shows a limited capability to provide such tool programs. Even of more assistance are automation programs which actually provide the user with a solution to the problem rather than just offering information and/or tools to assist the user in implementing the solution.

As systems become larger and more complex, it may be desirable to externalize the help function from the application program. This is suggested by U.S. Pat. No. 5,581,684, issued to Dudzik et al., and incorporated by reference. Such externalization permits the addition of help information after finalization of the application program without disturbing the basic application.

The major problem not addressed by the prior art, however, relates to providing user assistance regarding the interoperability of multiple, diverse system elements. This problem often exists concerning different application programs within a single computer. More difficult still, however, are interoperability concerns regarding multiple applications hosted on multiple computer platforms. Oftentimes, such interoperability issues are completely outside the scope of all of the user documentation and therefore not addressed at all.

SUMMARY OF THE INVENTION

The present invention overcomes the problems associated with the prior art by providing a system and methodology for implementing user assistance functions concerning interoperability of diverse applications, whether hosted on the same computer platform or hosted on different computer platforms. The operator is assisted by being offered information, tools and/or automation as appropriate to the problem presented. In some instances, animation or illustrations are utilized to permit complete and full understanding by the user of the assistance being provided.

The user may activate the assistance to be provided by the present invention either through an operating system help call or through executing the assistance program and selecting the desired assistance for the functions available. However, as a memory saving feature, logic within the assistance call, ensures that multiple copies of of the help engine are not loaded simultaneously. Using either method, the user may call on the assistance needed. For a user interfacing with an industry compatible computer running Microsoft Windows, the access may be through WinHelp or by executing the program item containing the assistance menu. In the preferred embodiment, the program item containing the assistance menu is called PathMate.

To enable the user to utilize either access technique, the logic for each individual assistance function, called "applet," must be compatibly developed using a standardized approach. The preferred method is a six-step process.

In the first step, an individual interoperation task is identified. It is crucial that each useful interoperation task be identified. Failure to do so ensures that the resulting assistance package will be incomplete. For that reason this step must be performed by highly skilled systems personnel having extensive experience and the capability to reason inductively.

The second step synthesizes a solution to each identified interoperation task. A given solution is optimized to be consistent with the background and understanding of the ultimate user and yet take advantage of the inside information known especially by developers and suppliers of the diverse system elements to be integrated. This task requires highly skilled system personnel employing essentially deductive problem solving.

The optimized solution determined by step two is documented in a standardized format known as a "lab note." Each lab note specifies a given interoperation task and its corresponding optimized solution.

In step number four, the person performing step numbers two and three creates any scripts and/or utilities deemed useful in implementing the optimized solution. The resulting automation is called an applet.

Finally, the results of steps 1–4 are presented to one or more specialists associated with the diverse system elements to be integrated for implementation of the solution. The resulting logic is called a solution. The solution will ordinarily consist of some or all of the following: help text, animation, program calls, selection parameters, macros, special documentation, and unique program code required to implement the solution. For interoperation tasks involving multiple computer platforms, these constituent parts of the solution will involve different programming languages and protocols, different systems architectures and philosophies, and different documentation standards. Therefore, it is necessary that the implementation of the solution be accomplished by one or more individuals having the requisite specific experience with the associated diverse system element(s).

All of the solutions useful to a given user configuration are combined into the assistance package needed for a given system. In that way a user is given assistance from her/his own frame of reference, even though many of the interoperative tasks will utilize diverse system elements totally foreign to the user.

Some solutions may even involve intermediate diverse system elements which are employed primarily for their existing data conversion and/or format control. This becomes expedient in situations wherein the intermediate diverse system element imports and exports a variety of file formats, for example. Therefore, such an intermediate diverse system element can be utilized simply for file conversion, a use probably never contemplated by its developers.

In the preferred embodiment, the user interfaces with an industry compatible computer running under Microsoft Windows. This machine is coupled to one or more large mainframe computers, such as the Unisys 2200 system. One or more additional diverse system elements may be present, such as UNIX or NT operating system and internet coupling. The user is deemed to be capable of satisfactory operation of the industry compatible computer with Windows but is deemed to be much less familiar with the Unisys 2200 system, as well as UNIX, internet, and such other diverse system elements as may be present. Therefore, the assistance package provides substantial utility in offering interoperability particularly with regard to the unfamiliar a diverse system elements.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like referenced numerals designate like parts throughout the figures thereof and wherein.

DETAILED DESCRIPTION OF THE PREFERRED EMBODIMENTS

Figure 1:
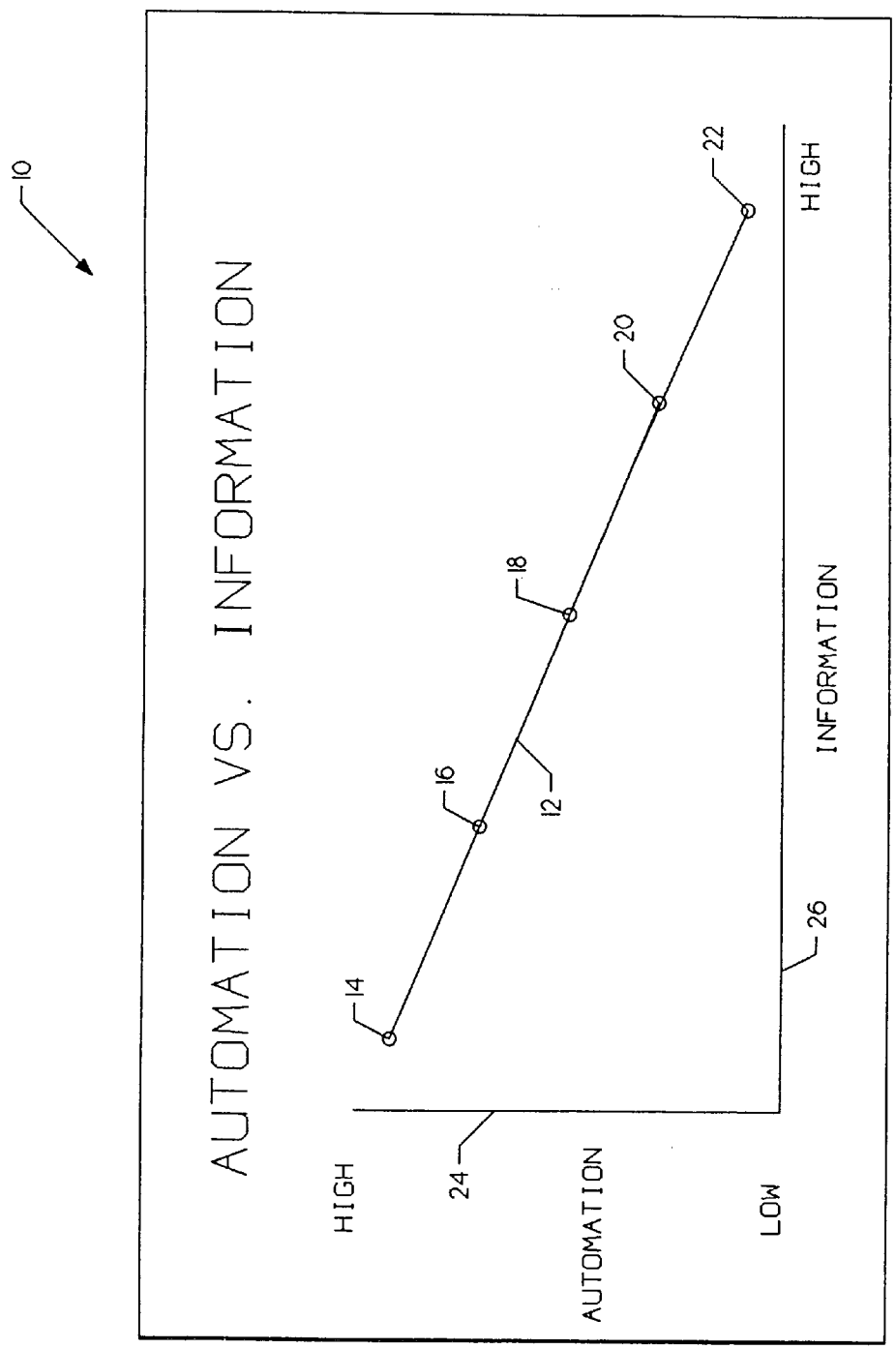
FIG. 1 is a graphical depiction of the various types of assistance.

FIG. 1 is a graphical representation 10 of the basic types of assistance. Curve 12 illustrates that as the help assistance becomes more highly automated (i.e. moves up the automation axis 24), less information needs be supplied. Conversely, as less automation is possible (i.e. moves down the automation axis 24), more information is necessary.

The highest level of automation is when the assistance function is intrinsic, as shown at point 14. At this level, virtually no additional information need be supplied.

At point 16 the assistance package provides one or more tools for performance of the interoperation task. The additional information required is necessary to permit the user to effectively utilize the tool(s) to perform the interoperation task.

One or more templates are supplied at point 18. At this level, considerably more information is needed for the user to effectively utilize the template(s) to perform the interoperation task.

A demonstration is supplied as a means of assistance at point 20. Considerable information is required to permit the user to relate the demonstration to the specific interoperation task to be performed.

Point 22 is the assistance approach which simply describes the steps to be performed by the user. Using this technique, the assistance package essentially provides only information. However, as with the presentation of any information, the assistance package can be structured to present the information in a way which permits easy and rapid assimilation by the user. For example, maximum use of automation is often desirable. Also indexing in a manner most readily accessible by the user greatly improves the process.

Figure 2:
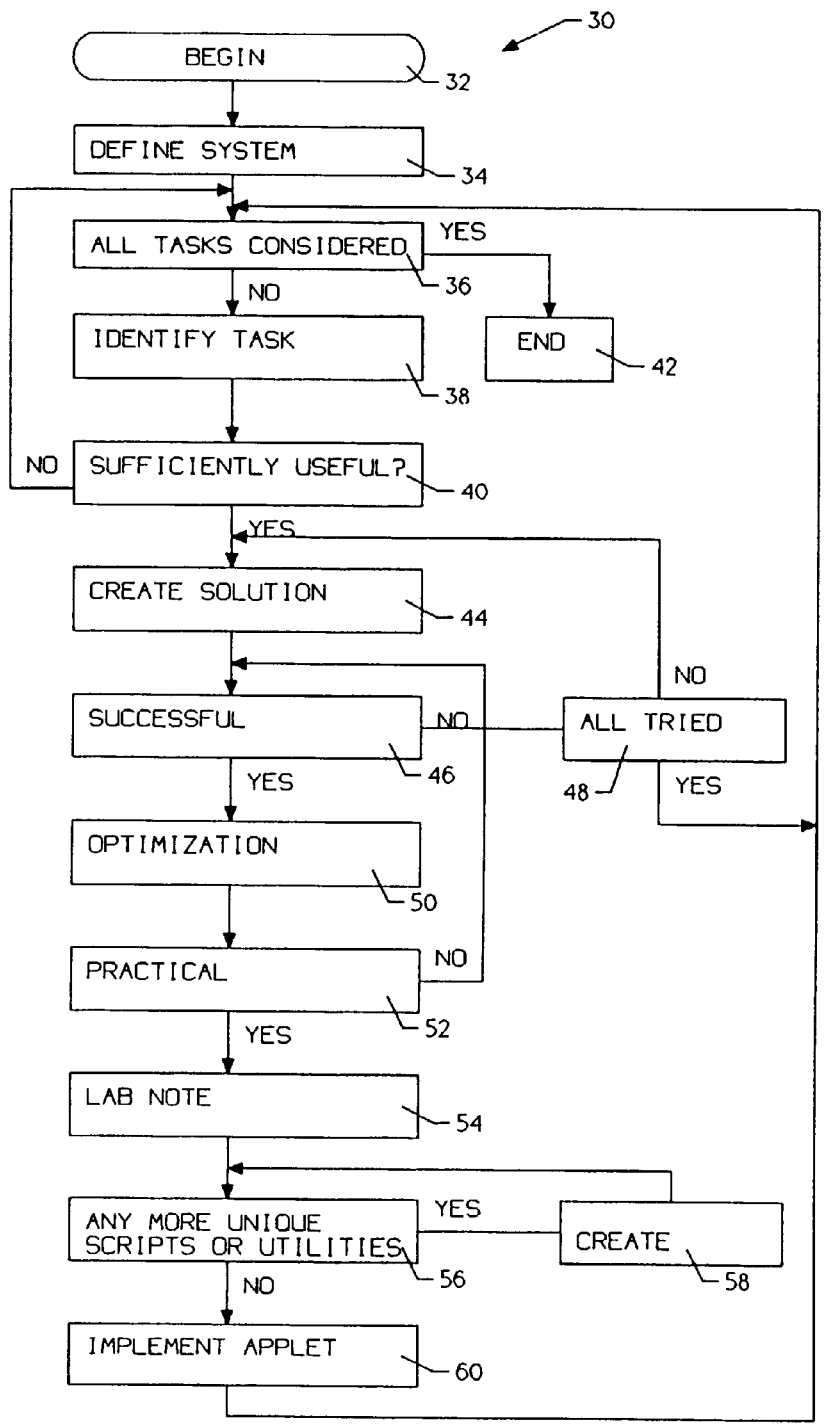
FIG. 2 is a flow chart showing the preferred method of assistance development.

FIG. 2 is a flow chart 30 showing the preferred method of developing the assistance package of the preferred embodiment of the present invention. The development process is begun at element 32. The total system is defined at element 34. In the preferred embodiment as is explained in greater detail below, multiple heterogeneous computer platforms are used in the preferred system, along with many diverse software elements.

Element 36 simply ensures that all interoperation tasks (for the target system) have been considered. Failure to consider all such tasks will render the assistance package less than complete and will probably prevent the user from performing numerous useful functions. When all known interoperation tasks have been completely addressed, the process is finished as shown by element 42.

An individual interoperative task is preliminarily defined at element 38. Ordinarily these interoperative tasks will be identified by highly skilled systems personnel having extensive experience on the configuration of the target system or a similar configuration. Element 40 queries whether the identified task is sufficiently useful to merit completing the interoperative development process and creating a solution. If not, the task is simply discarded as impractical and control returns to element 36 to again assess completeness of the process.

If the identified task is deemed sufficiently useful, the process proceeds with creation of a trial solution at element 44. Element 46 tests the trial solution to determine whether it works. If not, element 48 determines whether all solutions have been tested. If yes, that means that this solution for the identified task, though useful is not effective and practical. If not all trial solutions have yet been evaluated, element 48 gives control to element 44 for the creation of another trial solution.

When element 46 finds an operative solution, control is given to element 50 for optimization. This is accomplished using such expertise as is available concerning the diverse system components. Following optimization, element 52 makes one last practicality check. This may involve degree of specific configuration dependence, assumptions concerning operator skill, etc. If the optimized solution is deemed yet impractical, element 52 gives control to element 48 to determine if there are other potential solutions as yet untried.

If the solution passes the final practicality check at element 52, the solution developer documents his/her findings as a lab note at element 54. Each lab note must contain a description of the target system, the interoperation task, and the optimized solution developed. Along with the generation of the lab note, a determination is made at element 56 whether creation of unique scripts and/or utilities is appropriate. If yes, these are developed at element 58.

After completion of the lab note and any corresponding unique scripts and utilities, the development is given to one or more experts on the diverse system components at element 60. The actual implementation may involve generation of unique code, macros, help instructions, automation, etc. as deemed appropriate. The resulting work product is called a solution or also an applet, if it contains automation. Following completion of the solution, control is returned to element 36 until it is determined that all effective and practical solutions have been developed. The solutions are packaged together as described below resulting in the completed assistance package.

Figure 3:
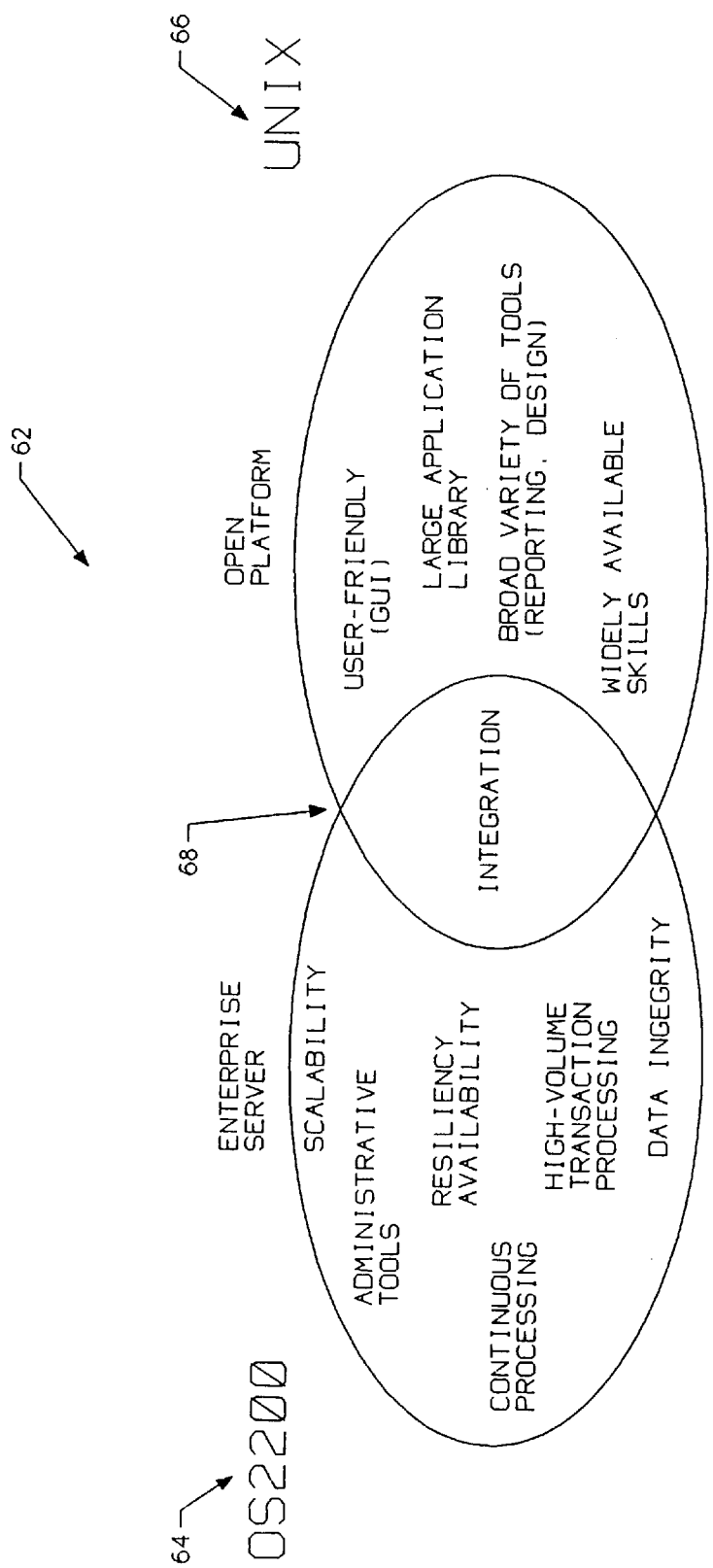
FIG. 3 is a graphical representation of the functional system of the preferred embodiment.

FIG. 3 is a graphical representation 62 of the functional preferred embodiment. In the preferred system, an industry compatible computer platform operating under Windows 95 (not shown in this view) provides the ultimate user with access to the Unisys OS 2200 environment 64 and also to the UNIX or NT based environment 66, such as those in a ClearPath HMP IX server. In this preferred mode, the OS 2200 platform 64 provides the enterprise server functions and the UNIX based environment 66 provides the open platform functions as shown.

Integration 68 of the enterprise server and open platform functions is provided by Unisys Corporation in commercially available packages which, along with the corresponding documentation, are incorporated herein by reference.

Figure 4:
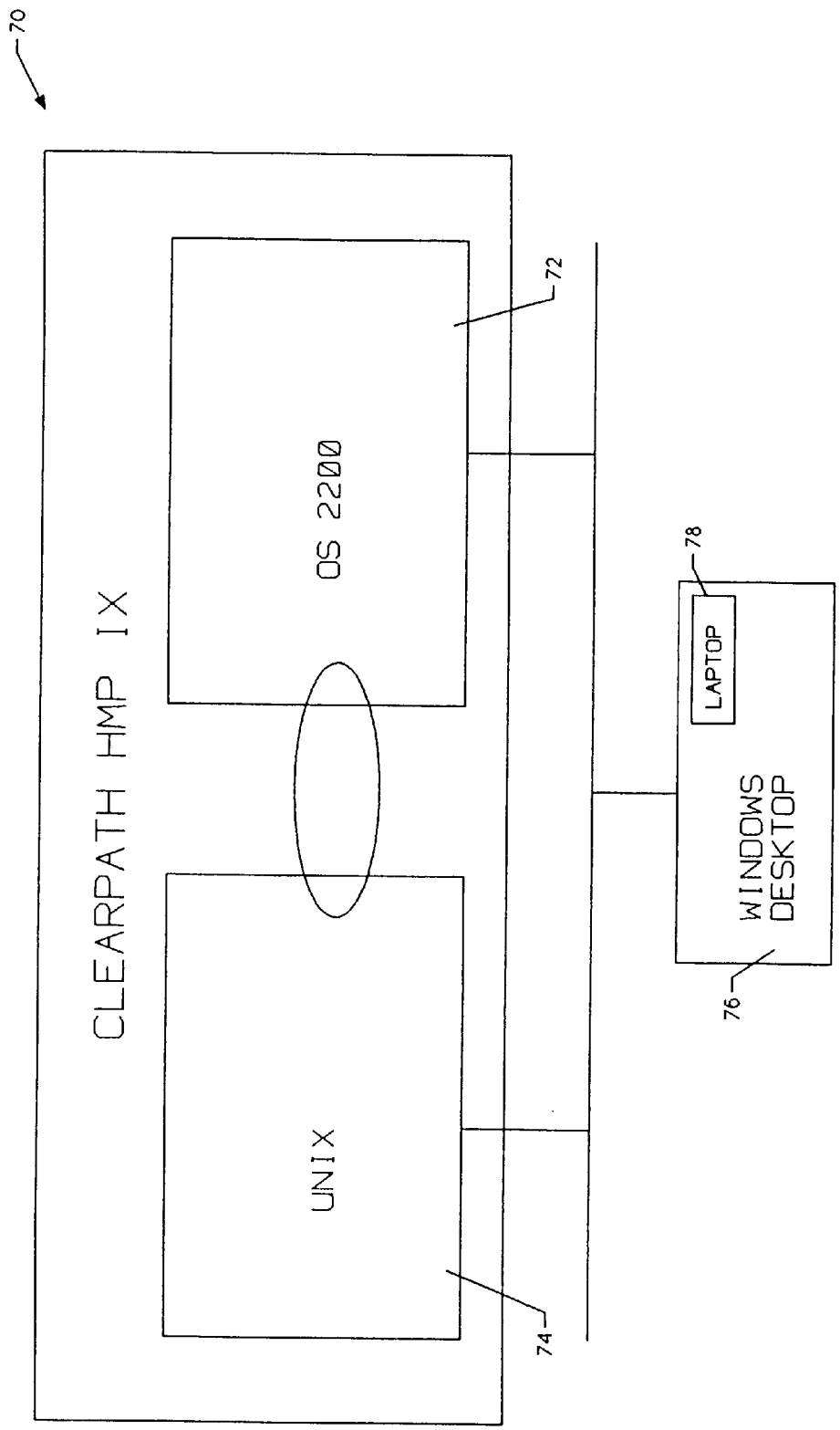
FIG. 4 is a block diagram of the hardware configuration of the preferred embodiment.

FIG. 4 is a block diagram showing the basic hardware components of the preferred embodiment. In accordance with the ClearPath HMP IX server 70, commercially available from Unisys Corporation, UNIX platform 74 and OS 2200 platform 72 exist within large scale mainframe hardware, also commercially available from Unisys Corporation. Industry compatible desktop computer 76 and laptop computer 78 provide the Windows 95 interface to the remainder of the system. These hardware and software elements along with supporting documentation are herein incorporated by reference.

Figure 5:
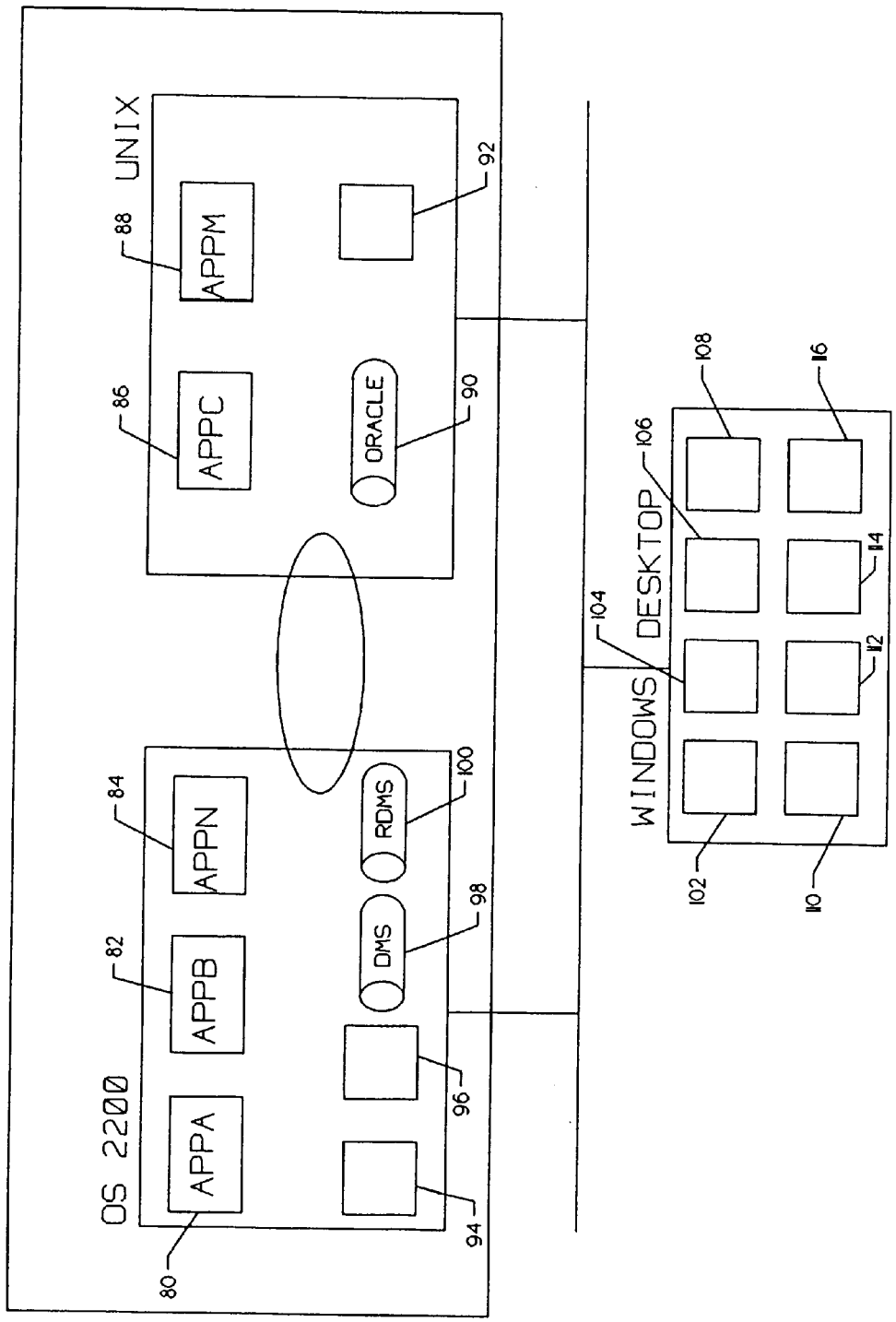
FIG. 5 is a block diagram of the software configuration of the preferred embodiment.

FIG. 5 is a schematic view of the various software elements of the preferred embodiment showing access by the user of the Windows 95 based industry compatible platform to the large scale mainframe system elements. The functions represented by icons 102, 104, 106, 108, 110, 112, 114, and 116 permit the user to directly call upon the mainframe functions using the ClearPath HMP IX server.

Under OS 2200 control are application 80, application 82, and application 84, along with the data base management and communication capabilities of OS 2200 DMS 98 and RDMS 100. Also available and shown schematically are the OS 2200 file handling functions 94 and report generation functions 96.

Similarly, UNIX controls application 86, application 88, Oracle data base manager 90, and the UNIX file management functions 92. Yet, the user at the industry compatible computer platform, has direct access to all of these functions utilizing commercially available diverse system elements, which are herein incorporated by reference along with corresponding supporting documentation.

Figure 6A:
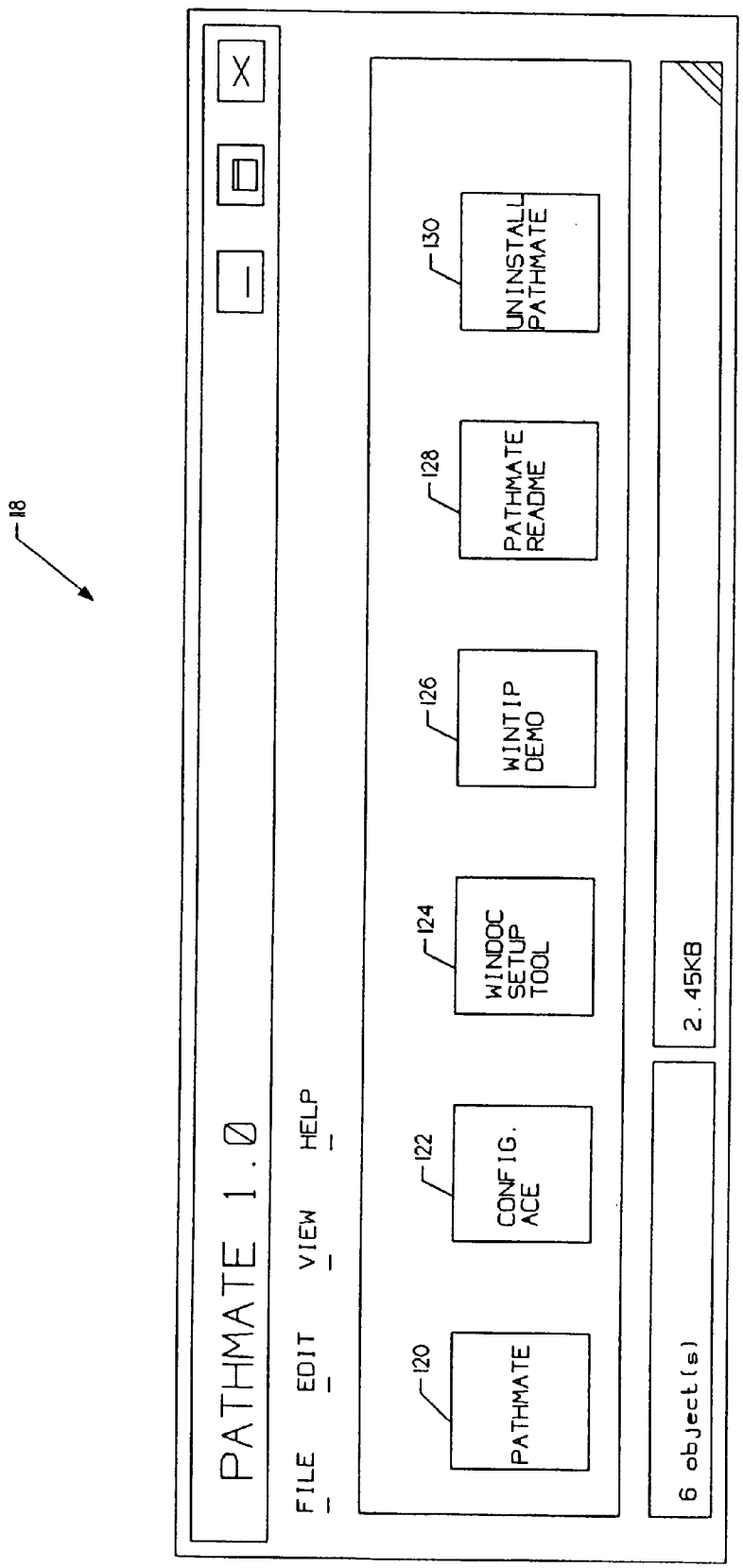
FIG. 6A is a view of the Windows 3.0 program group for PathMate of the preferred embodiment.

FIG. 6A is the PathMate program group window 118, from which the user can activate each of the functions of the present invention. Clicking icon 120 activates the normal PathMate assistance menu, which offers a hierarchical structure similar to a book's table of contents. Clicking the other icons in the program group activates the corresponding automation feature, which is linked to the normal PathMate assistance menu.

To configure the mainframe software using the ClearPath HMP IX server discussed above, the user clicks icon 122. Icon 124 provides special access to the WinDoc Setup program. Assistance in the form of a demonstration (see also FIG. 1) is received by clicking icon 126. The assistance is utilized in interoperation of the WinTIP demonstration.

As with most after market applications software, PathMate has provisions for last minute information concerning post development issues. Clicking icon 128 provides the user with the last minute README information. Clicking icon 130 deinstalls the PathMate program should the user find that necessary.

Figure 6B:
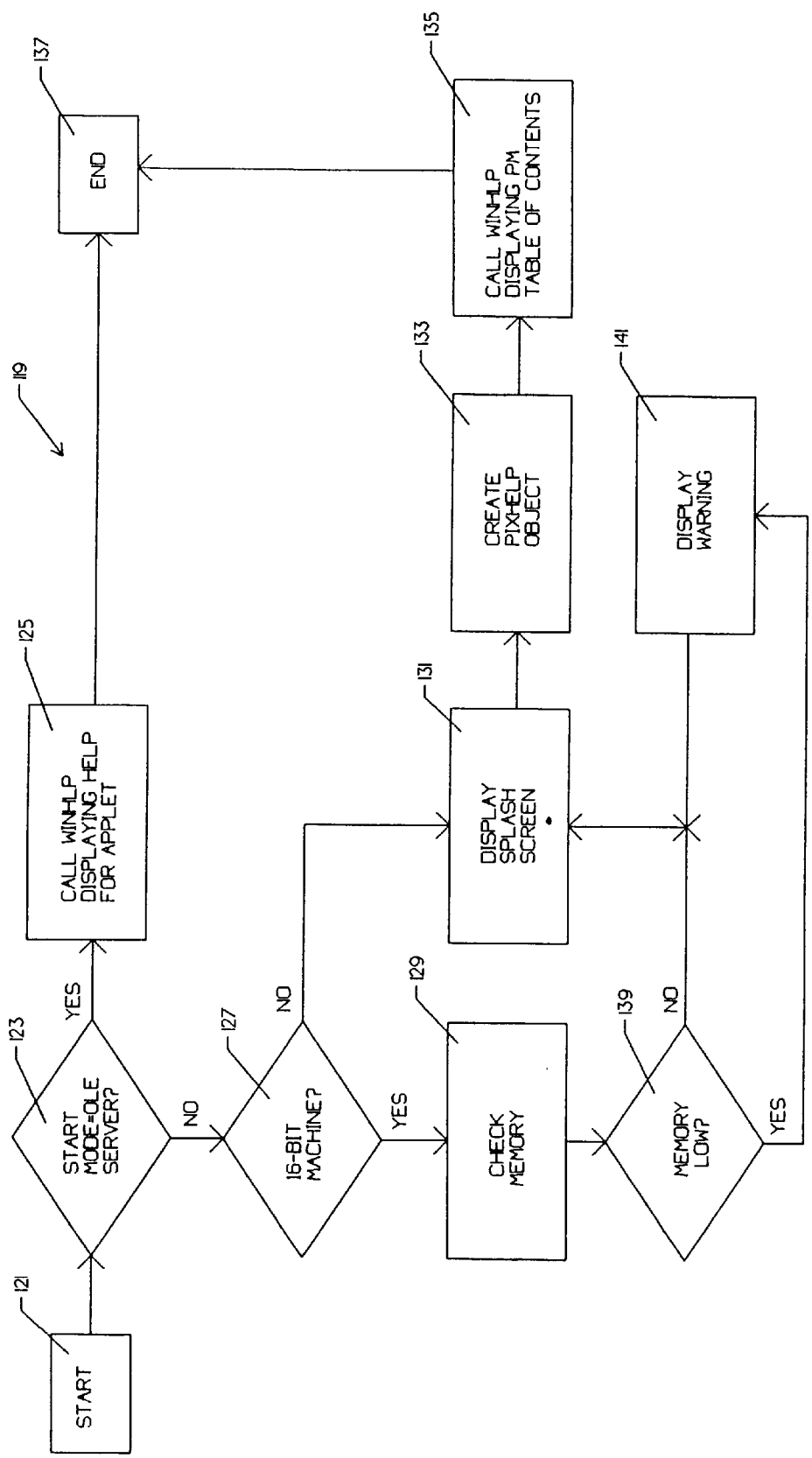
FIG. 6B is a flow chart showing user assistance provided from either entry mode.

FIG. 6B is a flow chart 119 showing assistance provided by either entry mode. Entry is via element 121. The entry mode is determined by element 123. If the initiation was as a result of OLE server, control is given to element 125 to call WinHlp displaying help for the applet. After initiation, control is given to element 137 for exit.

If element 123 determines that it was not a direct call, control is provided to element 127 to check the word width of the machine. If it is not a 16-bit machine, element 131 displays the splash screen. Element 129 checks available memory if it is not a 16-bit machine. If available memory is low, element 139 gives control to element 141 to display a low memory warning to the user.

If the availability of memory is adequate or after the low memory warning is displayed, control is transferred to element 131 for display of the splash screen. The pixhelp object is created at element 133, and element 135 calls WinHlp to display the table of contents. Exit is via element 137.

Figure 7:
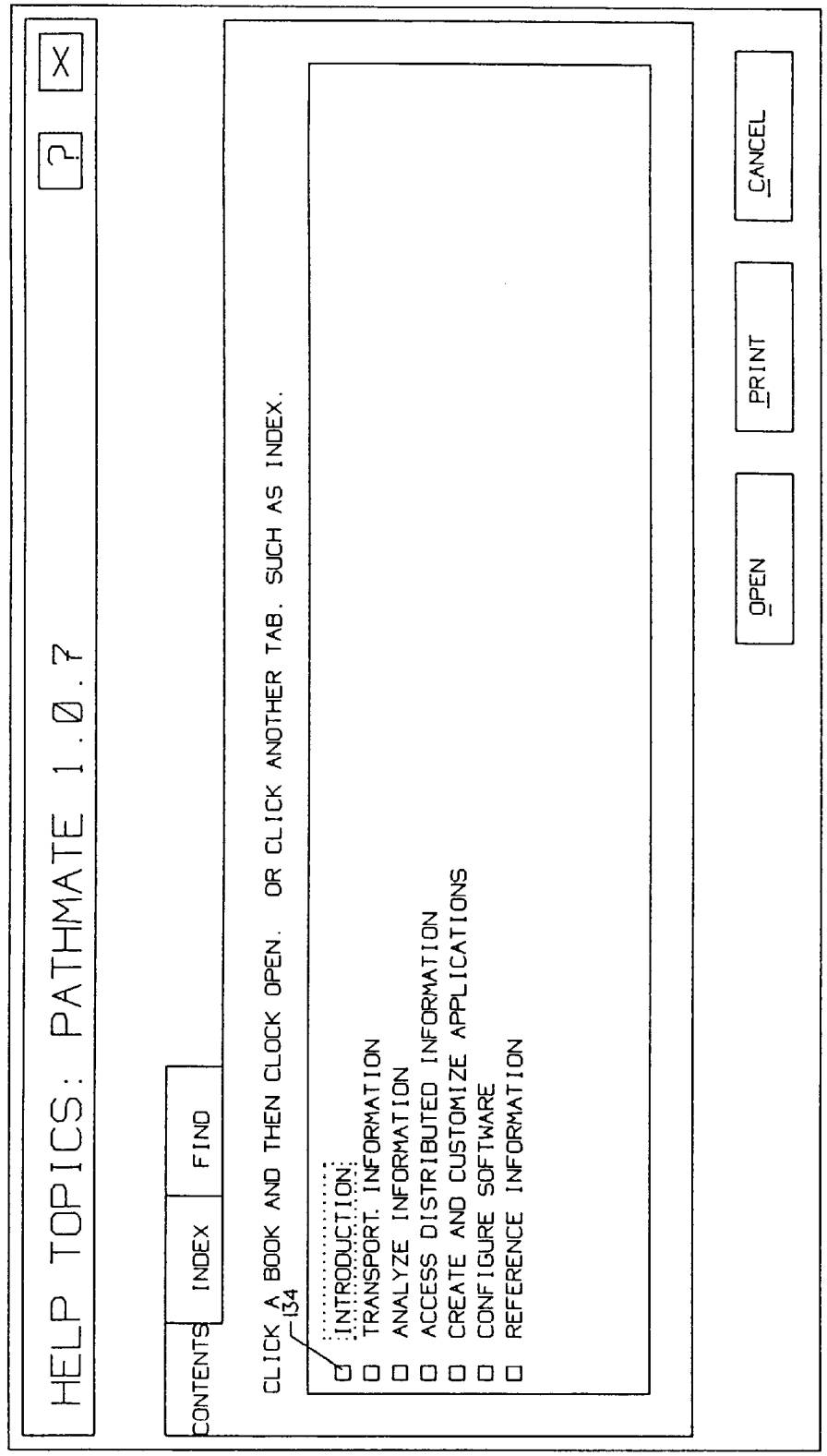
FIG. 7 is a view of the first level contents of the solution calls of the preferred embodiment.

FIG. 7 is window 132 showing the first level of the PathMate menu. This window is the result of clicking the PathMate icon 120. See also FIG. 6. Shown selected in this view is the introduction, which provides the user with a basic overview of the PathMate product.

Figure 8A:
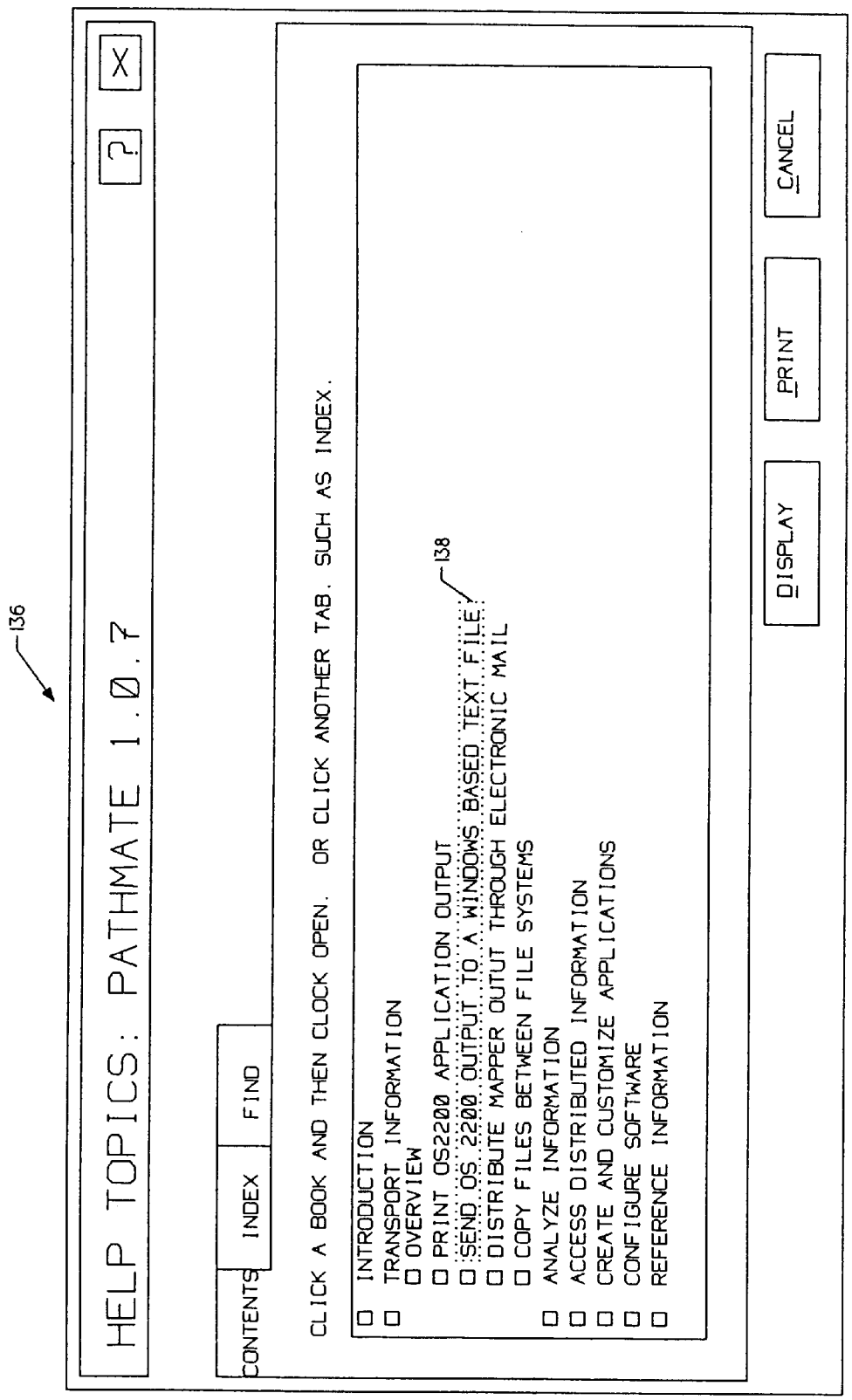
FIG. 8A is a view of the window of the preferred embodiment showing selection of a first solution.

FIG. 8A is a view of window 136 wherein the user is selecting assistance to transport information from an OS 2200 file to a Windows based text file. This is a particularly important function to be performed in a large scale data processing system. Specifically, with regard to the preferred embodiment (see also FIG. 4, for example), the user wants to access data files stored in OS 2200 files from a desk top or lap top industry compatible computer employing the Microsoft Windows operating system. Thus, the user has opportunity to utilize files generated and/or maintained by mainframe data processing resources of substantially greater capability than the Windows based system of her/his acquaintance. To provide the desired interoperation task, line 138 is highlighted as shown.

The preferred method for providing assistance for this particular interoperative task involves detailed "How To" instructions. However, the other techniques addressed above might similarly be employed.

Figure 8B:
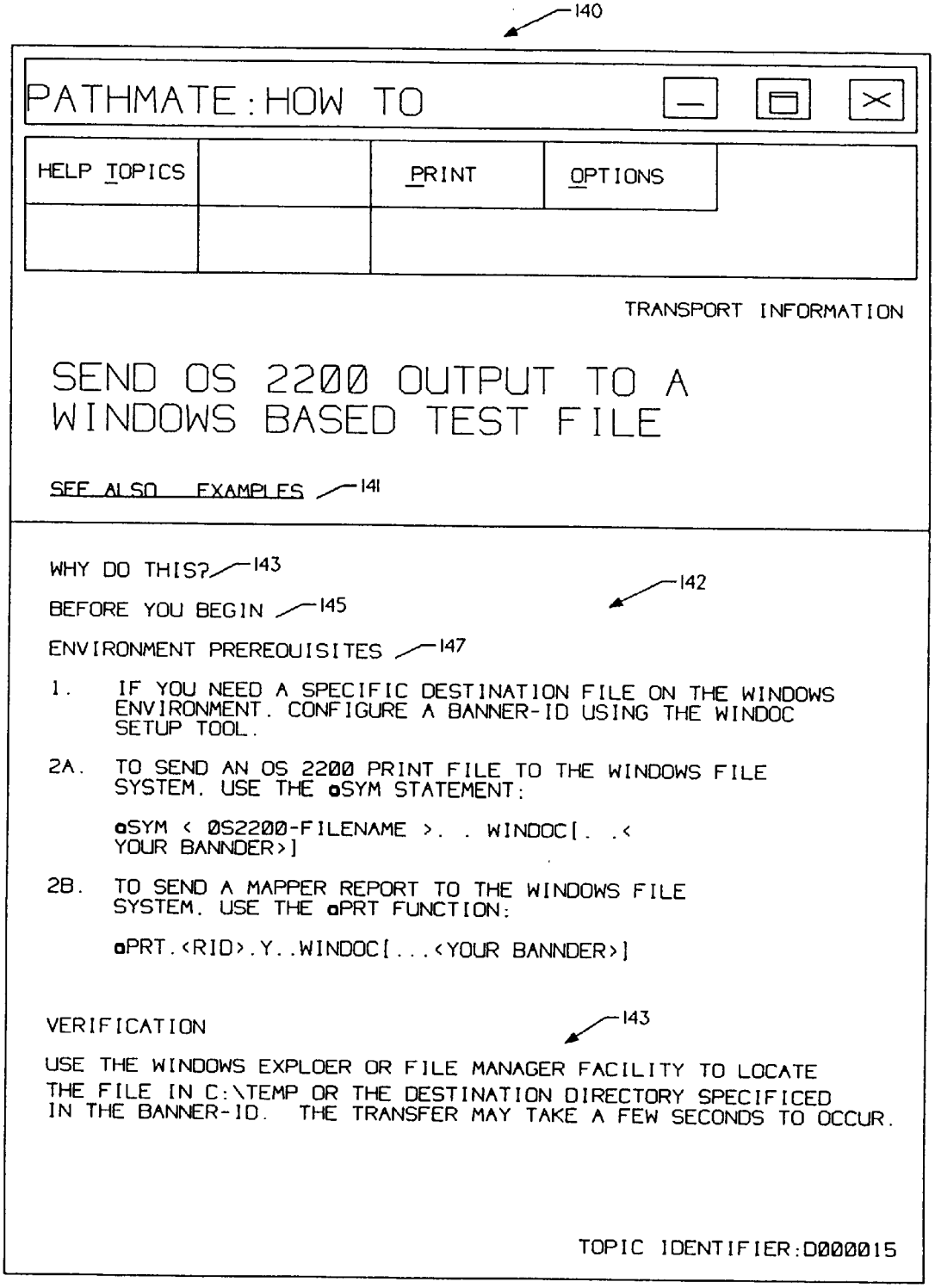
FIG. 8B is a view of the window providing user instructions for sending OS 2200 files to a Windows based text file.

FIG. 8B is a view of the primary screen 140 for the subject information transport interoperation task. Instruction list 142 is provided to the user. By performing the listed tasks, the user causes the data processing system to transfer the identified file from the OS 2200 format and storage to the Windows environment. Additional information, such as verification note 143 are also provided. Standard hypertext format labels 141, 143, 145, and 147 offer the user ancillary but related information. Often found particularly useful in interoperation assistance, is using hypertext calls can reference user assistance regarding other applications.

Figure 8C:
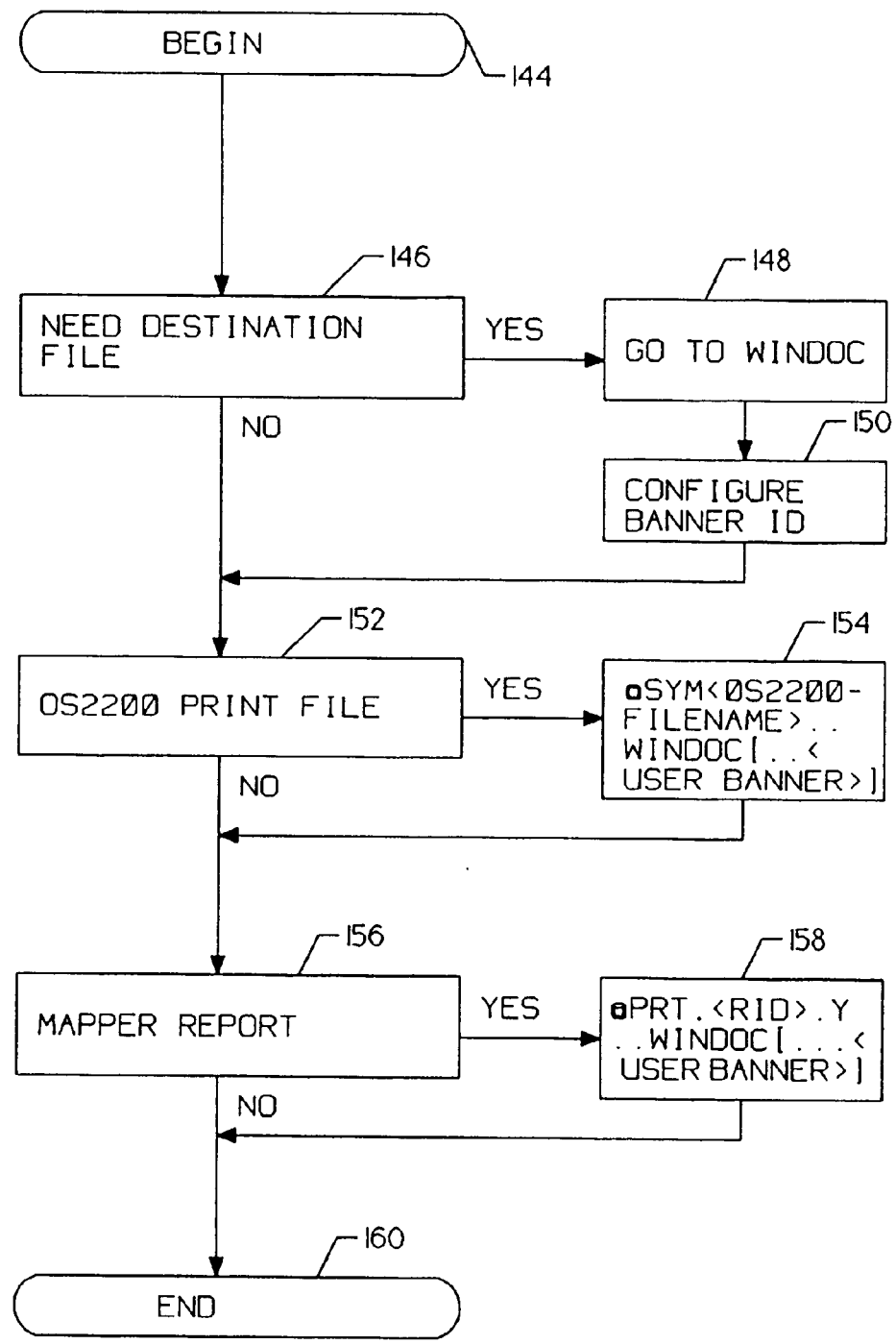
FIG. 8C is a flow chart showing the steps for transferring files from OS 2200 to Windows.
Figure 8D:
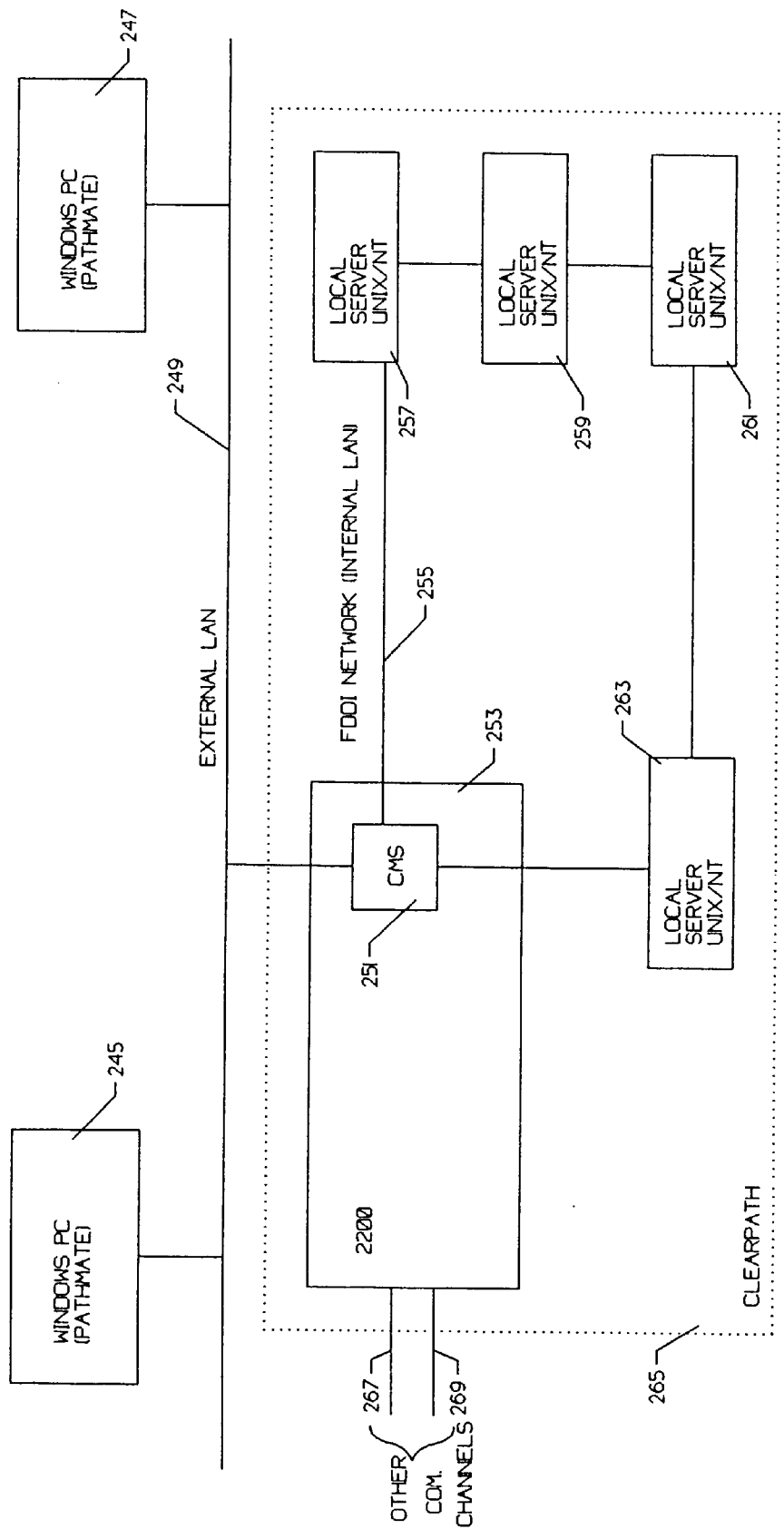
Figure 9:
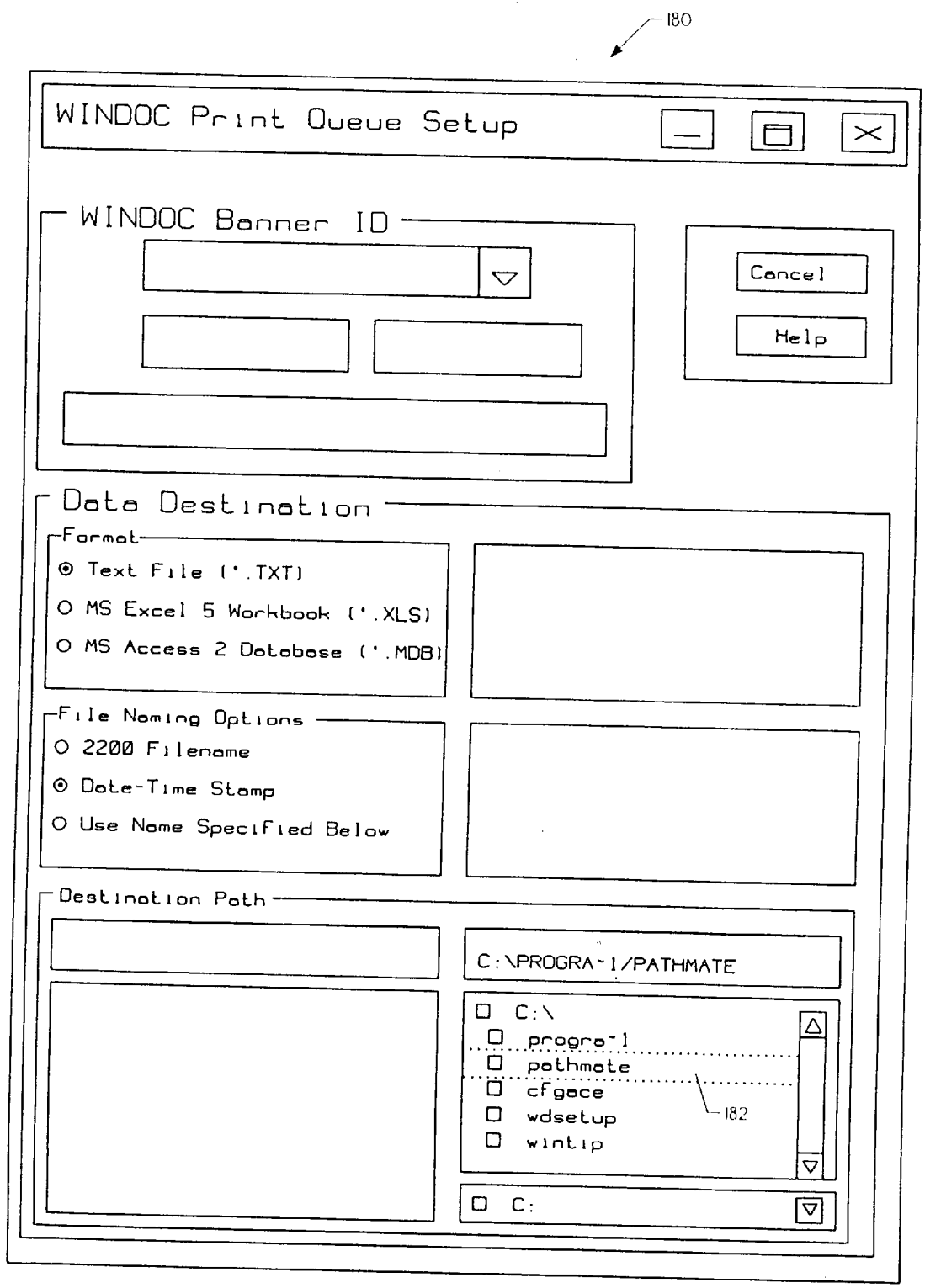
FIG. 9 is a view of the window providing alternative entry to the assistance package.

FIG. 8C is a flow chart for performing the interoperation task. The interoperation task is begun at element 144. A determination is made at element 146 whether a Windows destination file is needed. If yes, control is given to element 148 for designation of the destination file name. This step is also shown in FIG. 9 as discussed below. A banner-id is chosen at element 150 and control is given to element 152.

The determination is made at element 152 whether the source file is an OS 2200 Print File. If yes, control is given to element 154, for generation and use of the statement:

@SYM<OS2200 filename>,,WINDOC[<user banner>]
Control is given to element 156.

At element 156 a determination is made whether the source file is a MAPPER report. If yes, control is given to element 158 for generation and use of the statement:

@PRT,<RID>,Y,,WINDOC[<user banner>]

After use of the statement, control is given to element 160 for exit.

FIG. 9 is window 180 for WINDOC Print Queue Setup (see also FIGS. 8A and 8B). The user goes to this window in accordance with element 148 (see also FIG. 8C). This window has line 182 highlighted, which specifies PathMate as an input source. In this way, PathMate provides the link to WINDOC.

Figure 10A:
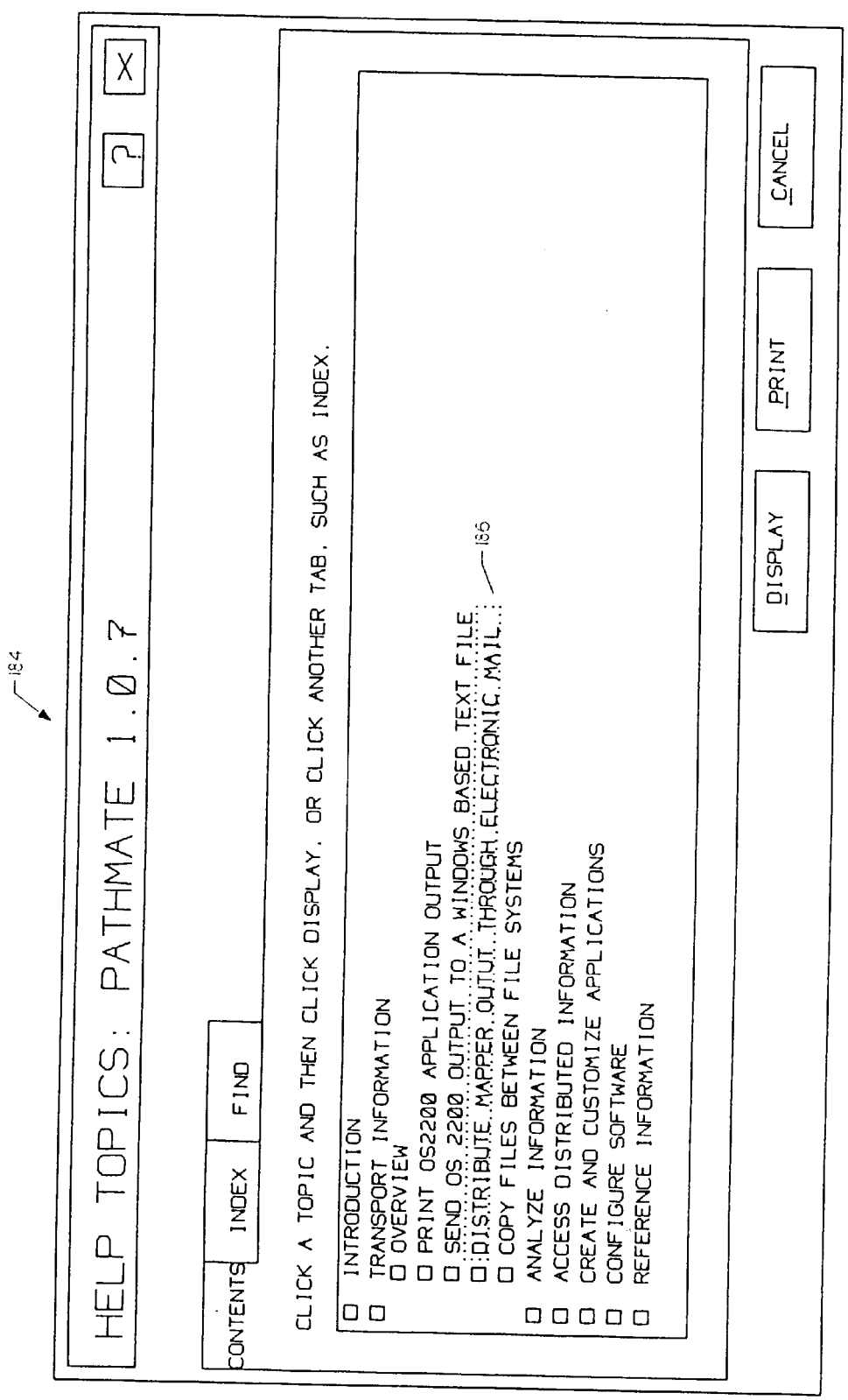
FIG. 10A is a view of the window of the preferred embodiment showing selection of a second solution.

FIG. 10A is window 184 which shows selection by the user of another information transfer interoperation task. Line 186 is highlighted which selects distribution of MAPPER output over electronic mail. MAPPER is a commercially available data management and reporting system provided by Unisys Corporation. The subject interoperation task takes reports generated by the MAPPER system and circulates them to a distribution list over electronic mail facilities. This is an excellent way to provide paperless management reporting.

Figure 10B:
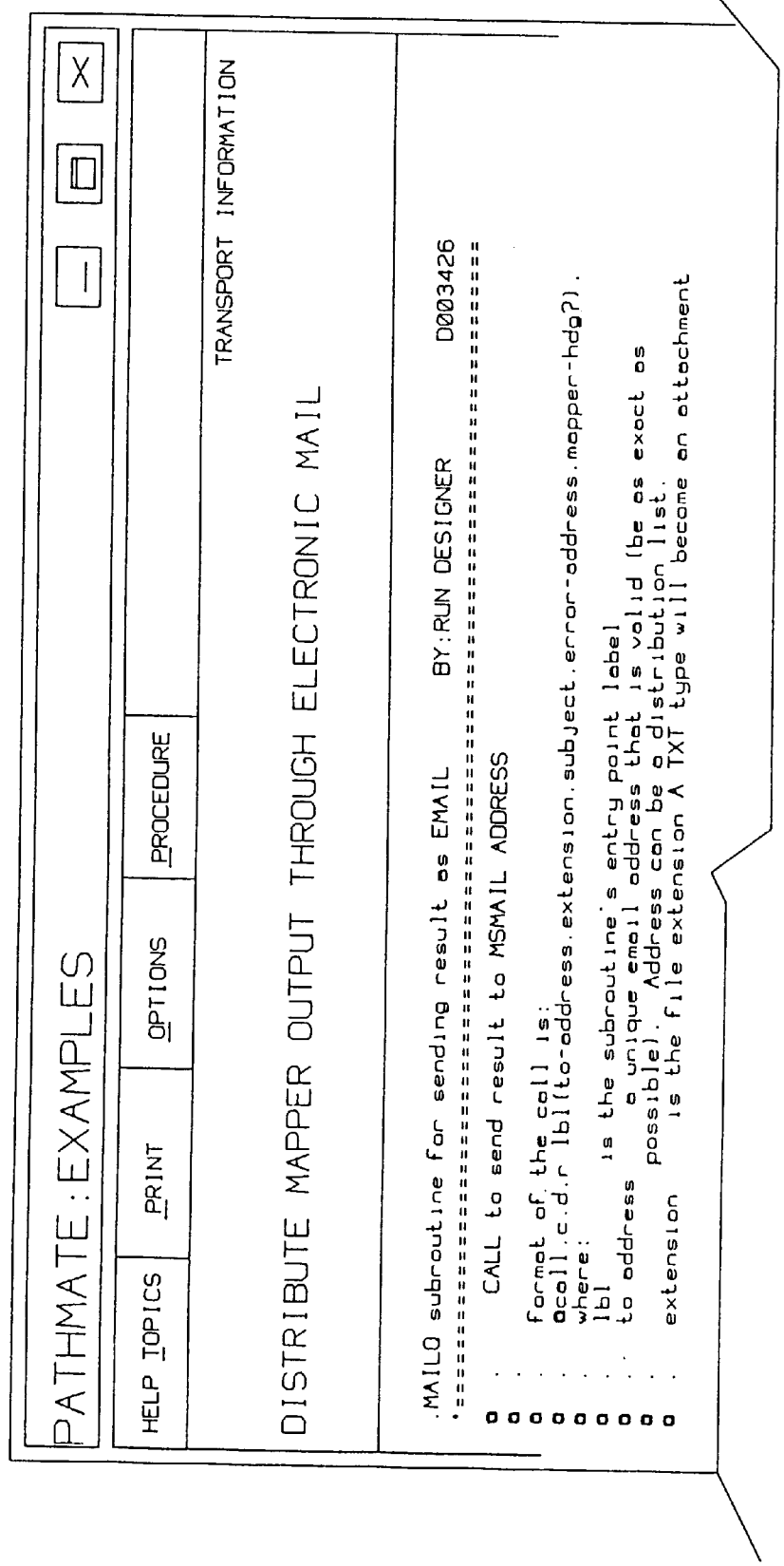
FIG. 10B is a view of a subroutine to send a Mapper report over electronic mail.

FIG. 10B is a method of transferring a copy of sample MAPPER report 188 over electronic mail. By transferring such management reports in this way, the recipient of the report may utilize all of the various electronic mail tools to store, edit, print, and forward the data from the management report.

Figure 11:
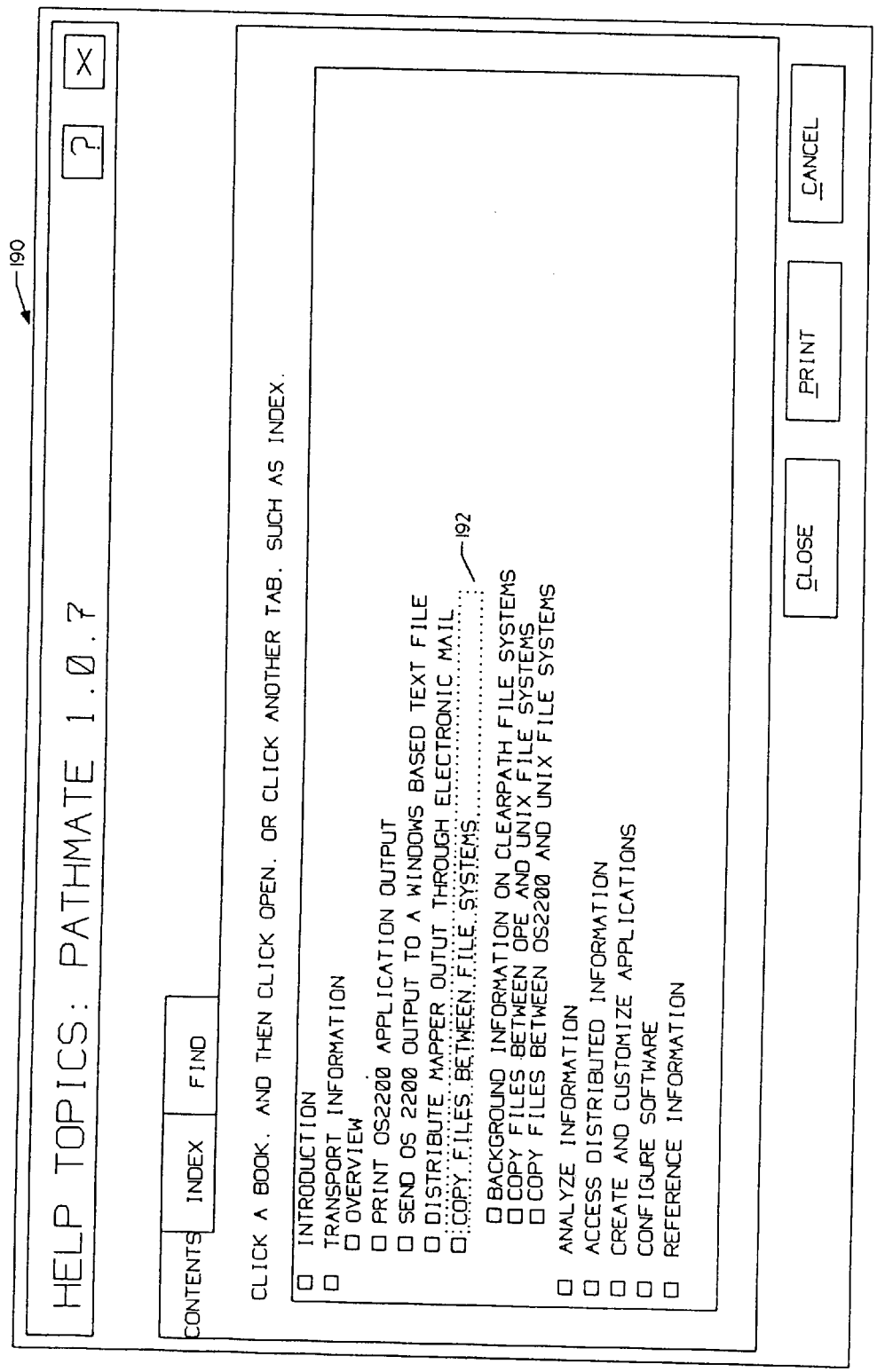
FIG. 11 is a view of the window of the preferred embodiment showing selection of a third solution.

FIG. 11 is a view of Window 190 with user selection of assistance for copying files between systems. Selection is made by highlighting line 192. It can be seen from window 190 that the copy files function includes three subfunctions. The first provides assistance in using the different file systems on a ClearPath HMP IX server. As discussed above, the ClearPath server is a software and hardware system providing a heterogeneous computer platform. The product is commercially available from Unisys Corporation.

The remaining two functions provide for transfer of files between UNIX protocol and either OPE or OS 2200. Using these capabilities, it can be readily seen that the user has direct access to data generated and/or stored in widely diverse formats on multiple, architecturally distinct hardware resources.

Figure 12A:
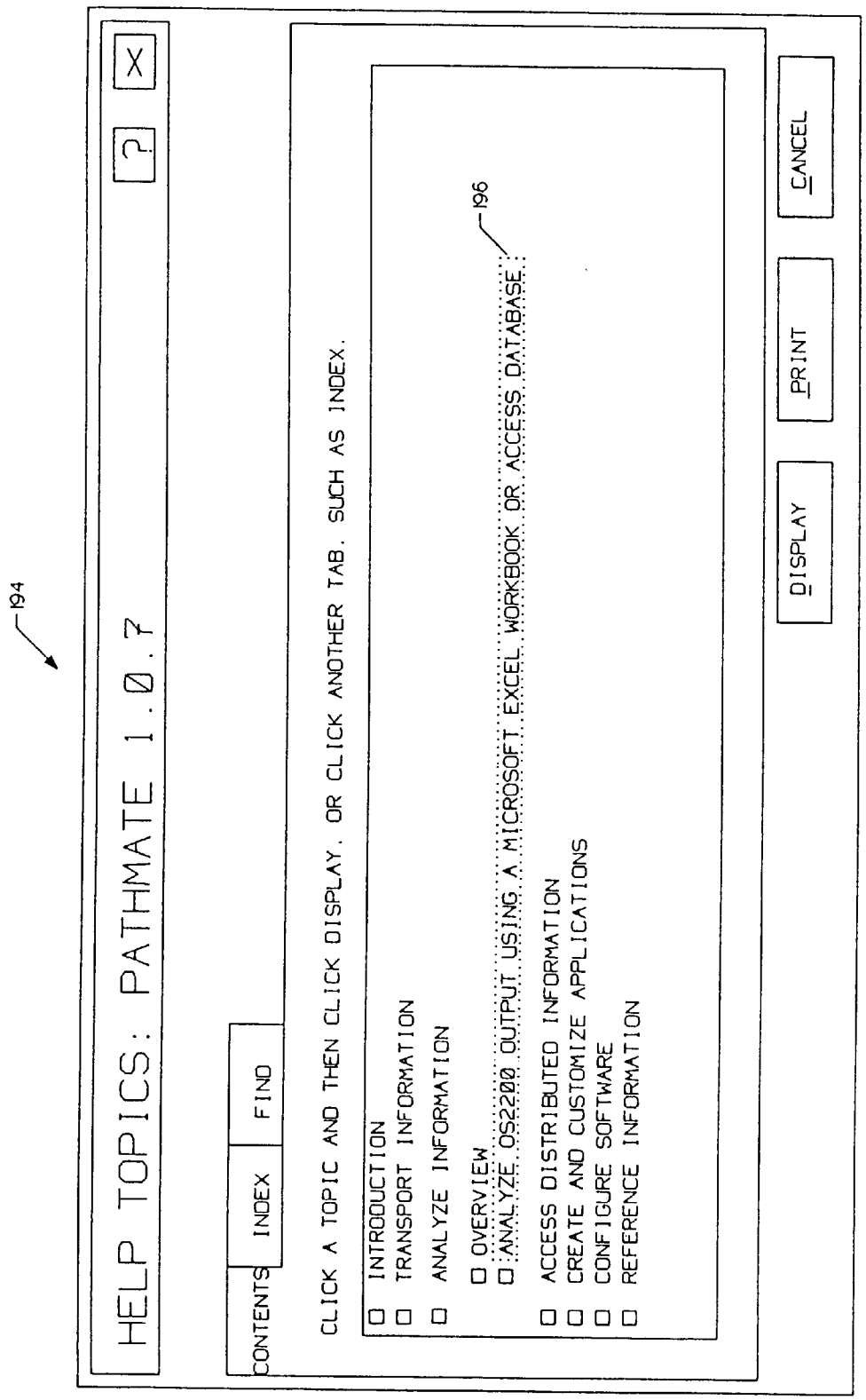
FIG. 12A is a view of the window of the preferred embodiment showing selection of a fourth solution.
Figure 12B:
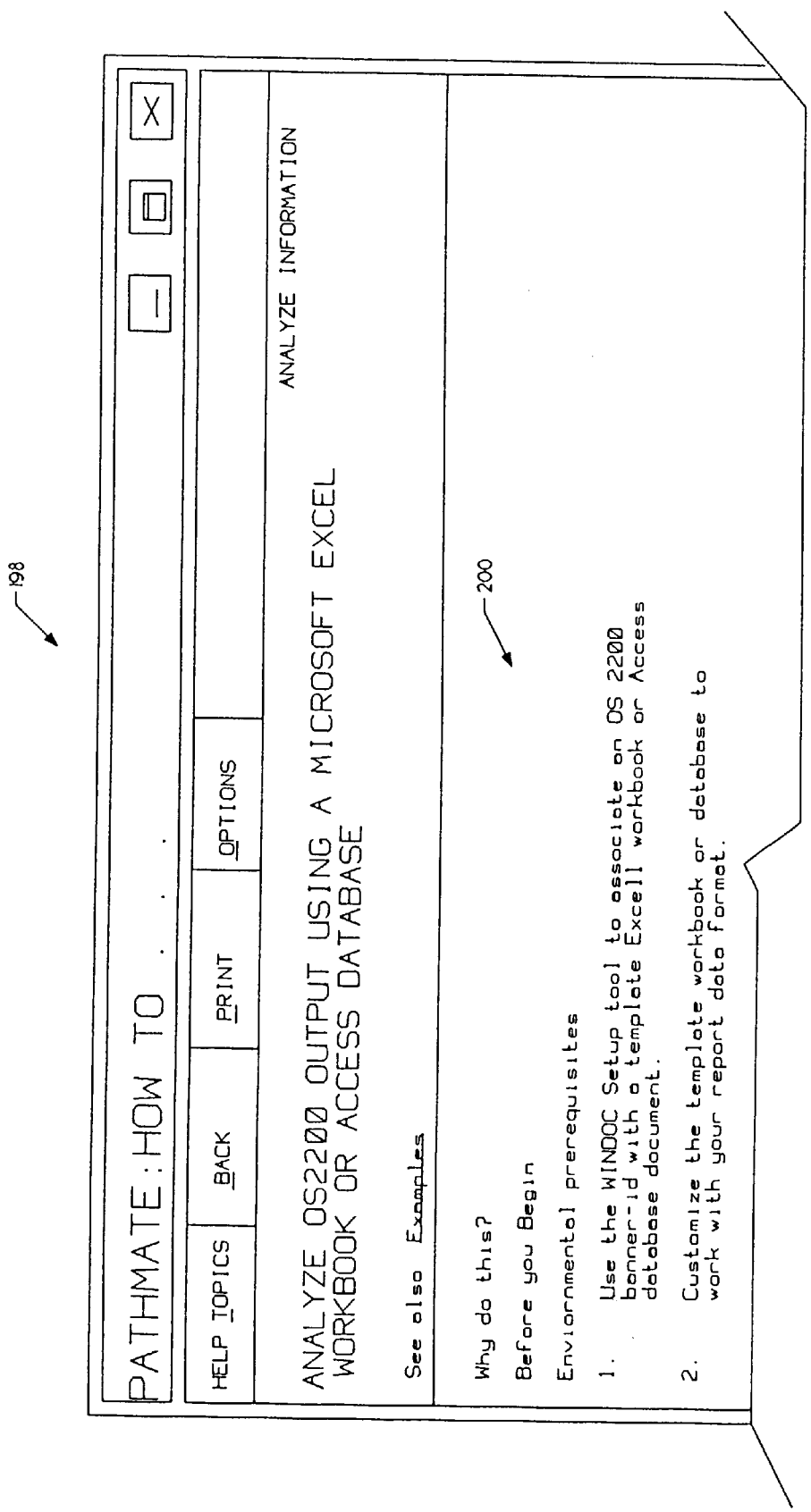
FIG. 12B is a view of the assistance provided for Excel analysis.

FIG. 12A is a view of window 194 from which the user has selected assistance with the analysis of information. The specific subfunction selected is analyzing data from OS 2200 files using Windows based application programs. Line 196 has been highlighted to select the subfunction. The OS 2200 data has been generated/stored using the Unisys 2200 mainframe computer platform. It is reformatted as shown and provided to a Windows controlled, industry compatible computer platform. As is seen in the preferred embodiment, the analysis may be performed by either Microsoft Excel or Access database, both of which being commercially available application software packages.

FIG. 12D is window 198 showing instruction list 200, which is provided by PathMate for the assistance of the user in performing the selected interoperation task. At step 1 the user must use the WINDOC Setup tool (see also FIG. 9) to link the OS 2200 banner-id with a template Excel workbook or Access database document (see above for linking OS 2200 to WINDOC).

The template and data are next customized as shown. For OS 2200 batch or demand batch run data, the user executes:

@SYM<OS2200 filename>,,WINDOC,,<Selected Windows banner>

On the other hand, for MAPPER generated and accessed data, the user executes:

@PRT.<RID>,Y,,WINDOC,,<Selected Windows banner>

In this manner the user performs Excel and/or Access database analysis on OS 2200 based data.

Figure 13A:
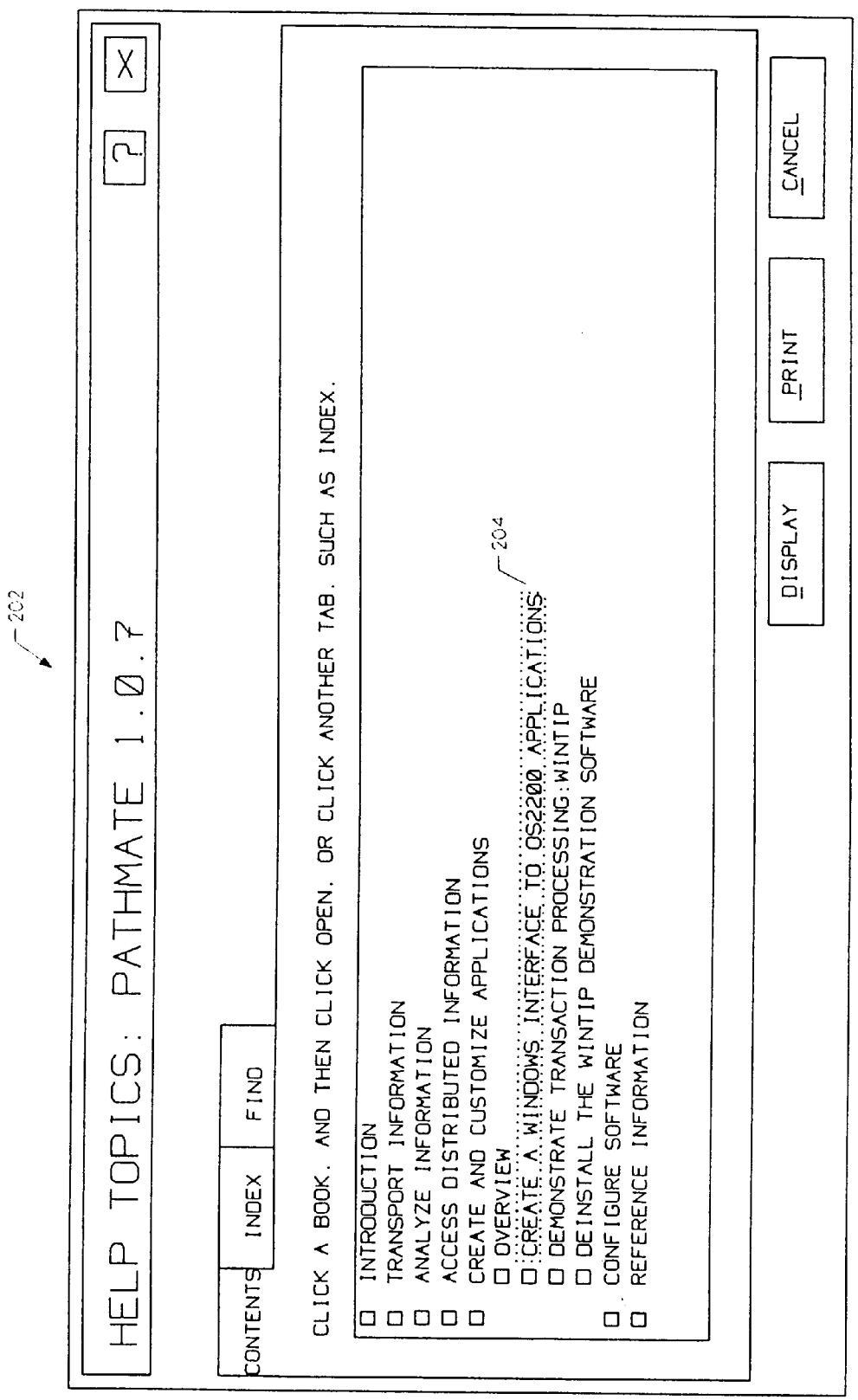
FIG. 13A is a view of the window of the preferred embodiment showing selection of a fifth solution.

FIG. 13A is a view of window 202 showing selection of assistance to establish a Windows interface to an OS 2200 application. This is accomplished by highlighting line 204 as shown. Establishment of this interface permits the user to interact with an executing OS 2200 application using an industry compatible desk top or lap top computer platform with a Microsoft Windows environment.

Figure 13B:
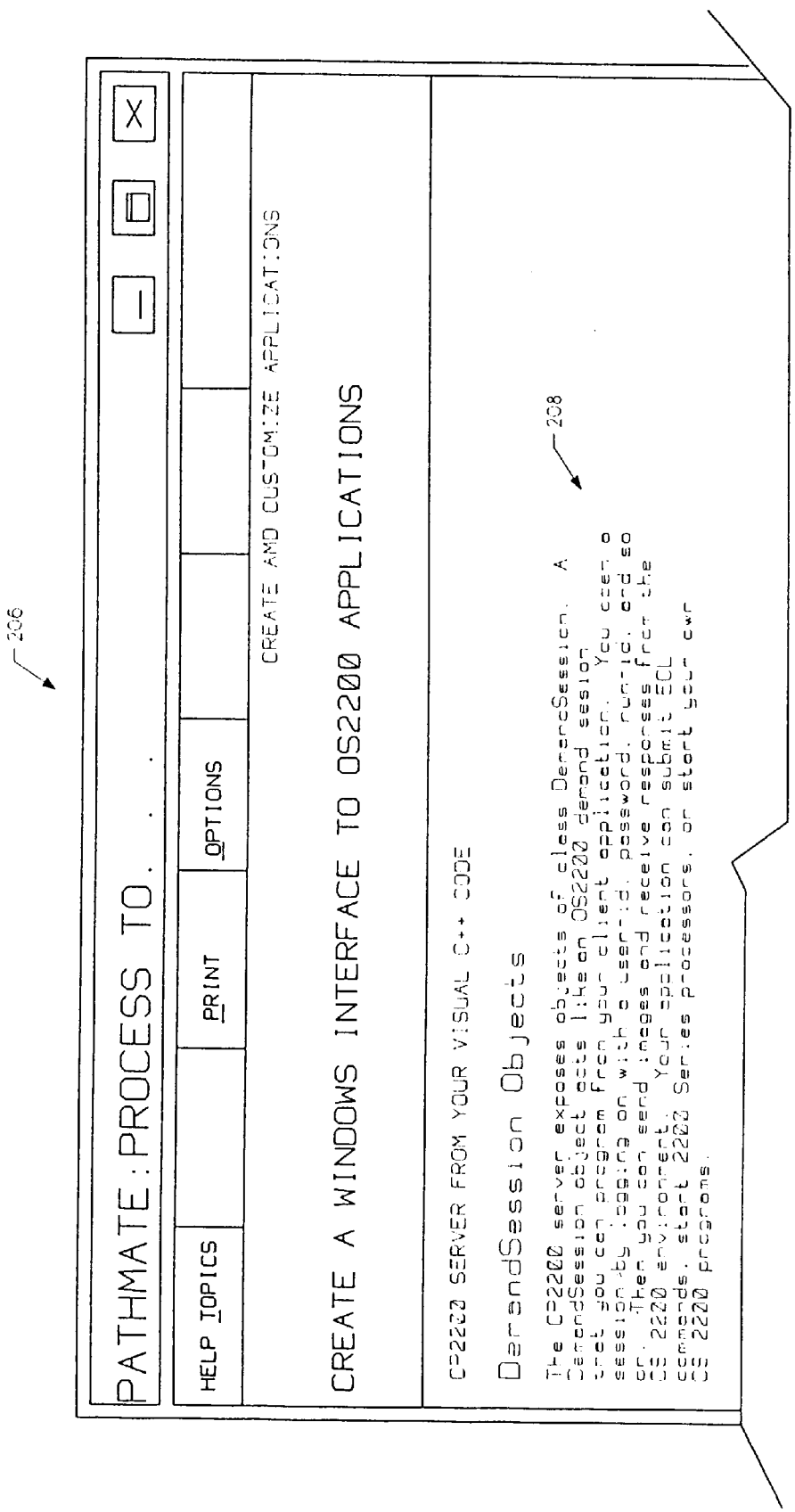
FIG. 13B is a view of the window showing specific assistance.

FIG. 13B is a view of window 206 providing a narrative explanation for establishing a window interface to an OS 2200 application. This narrative is deemed adequate to familiarize a user, having no prior OS 2200 experience, with the basics necessary to operate the OS 2200 application via the Windows controlled, industry compatible computer platform. The text—DemandSession Class—(later in the narrative) is standard hypertext. By clicking on this hypertext, the user gives control to the next succeeding window for further information and assistance. This more detailed window is shown below as FIG. 13C.

Figure 13C:
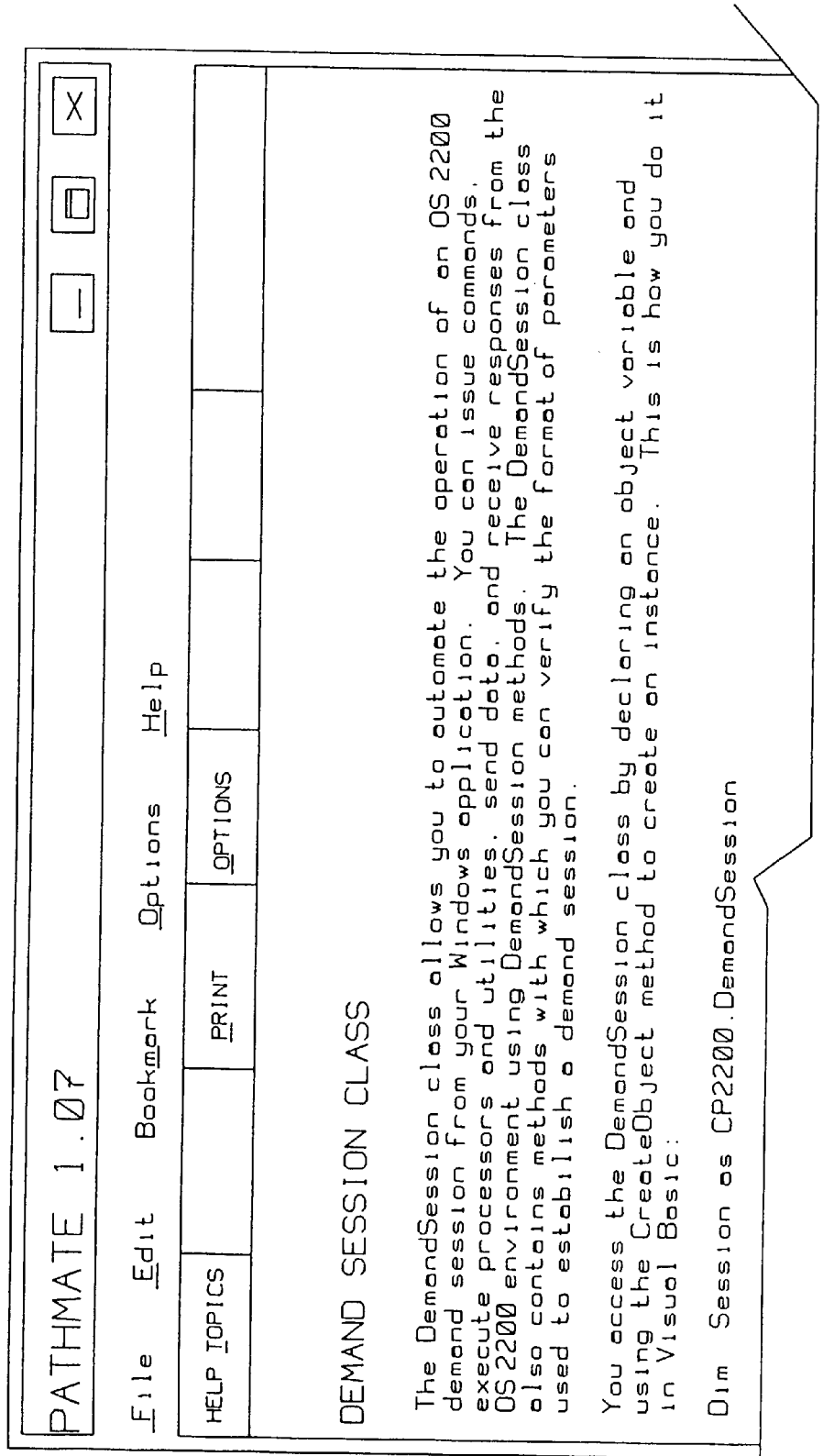
FIG. 13C is a view of the window providing assistance to demand session linkage.

FIG. 13C is a view of window 208 with more detailed assistance in establishing a window interface to an OS 2200 application program. As can be seen, this assistance provides Visual Basic instructions for the user to enter and execute. These instructions when executed will provide the desired interface.

Figure 14A:
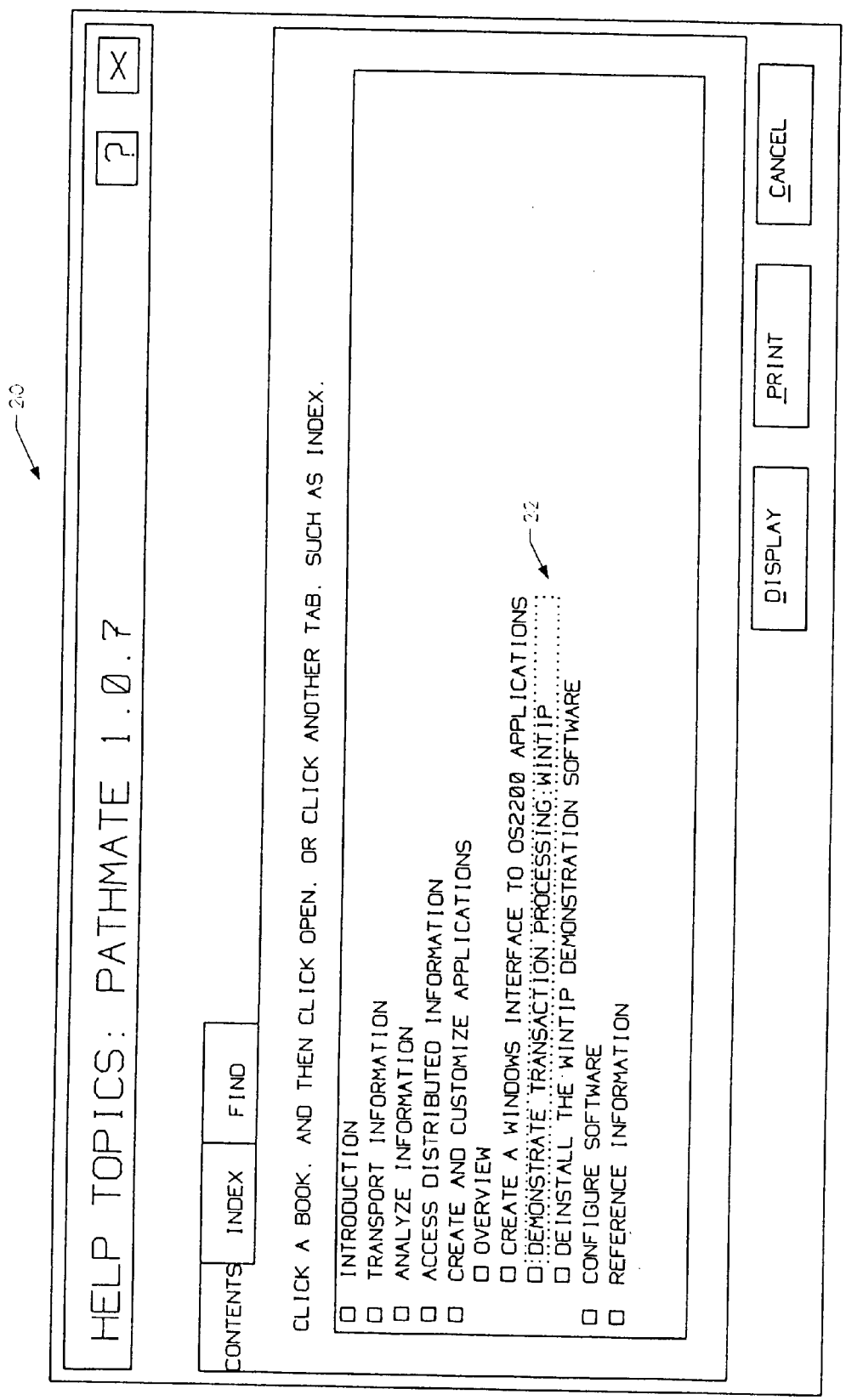
FIG. 14A is a view of the window of the preferred embodiment showing selection of a sixth solution.

FIG. 14A is a view of window 210 by which the user can select assistance via a WinTIP demonstration. As discussed above, the demonstration method provides a much more illustrative means of giving assistance without substantial textual information. The assistance is selected when the user highlights line 212 as shown. To perform the demonstration, an interface path is established between the OS 2200 file system and the WinTIP function. This path may be subsequently utilized for post demonstration transaction processing.

Figure 14B:
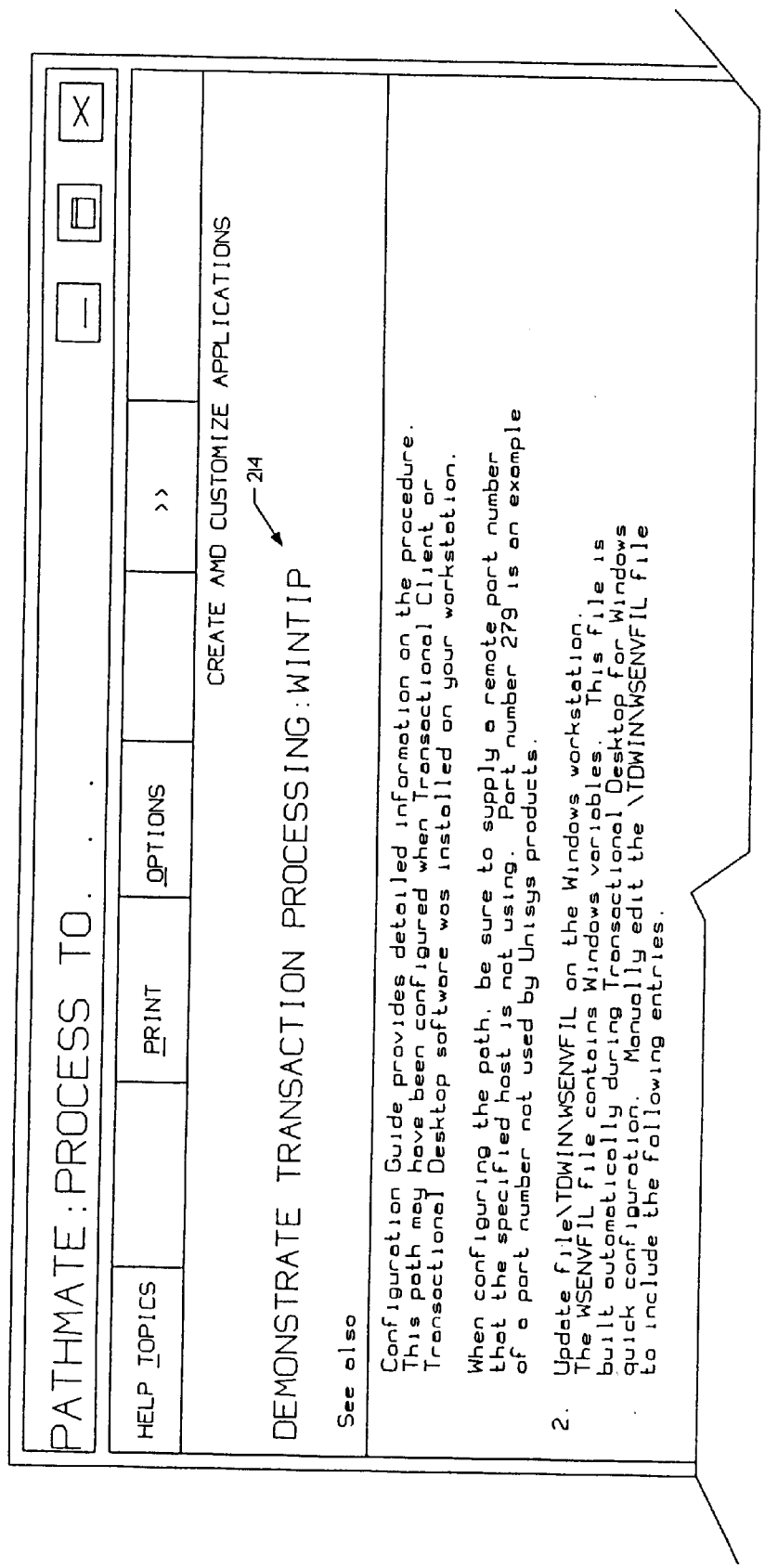
FIG. 14B is a view of the detailed help window for demonstration of transaction processing (WinTIP)

FIG. 14B is a view of window 214 with detailed instructions for performing the WinTIP demonstration. The window has been scrolled down in the view shown. As can be seen, standard hypertext format is also utilized.

Figure 15A:
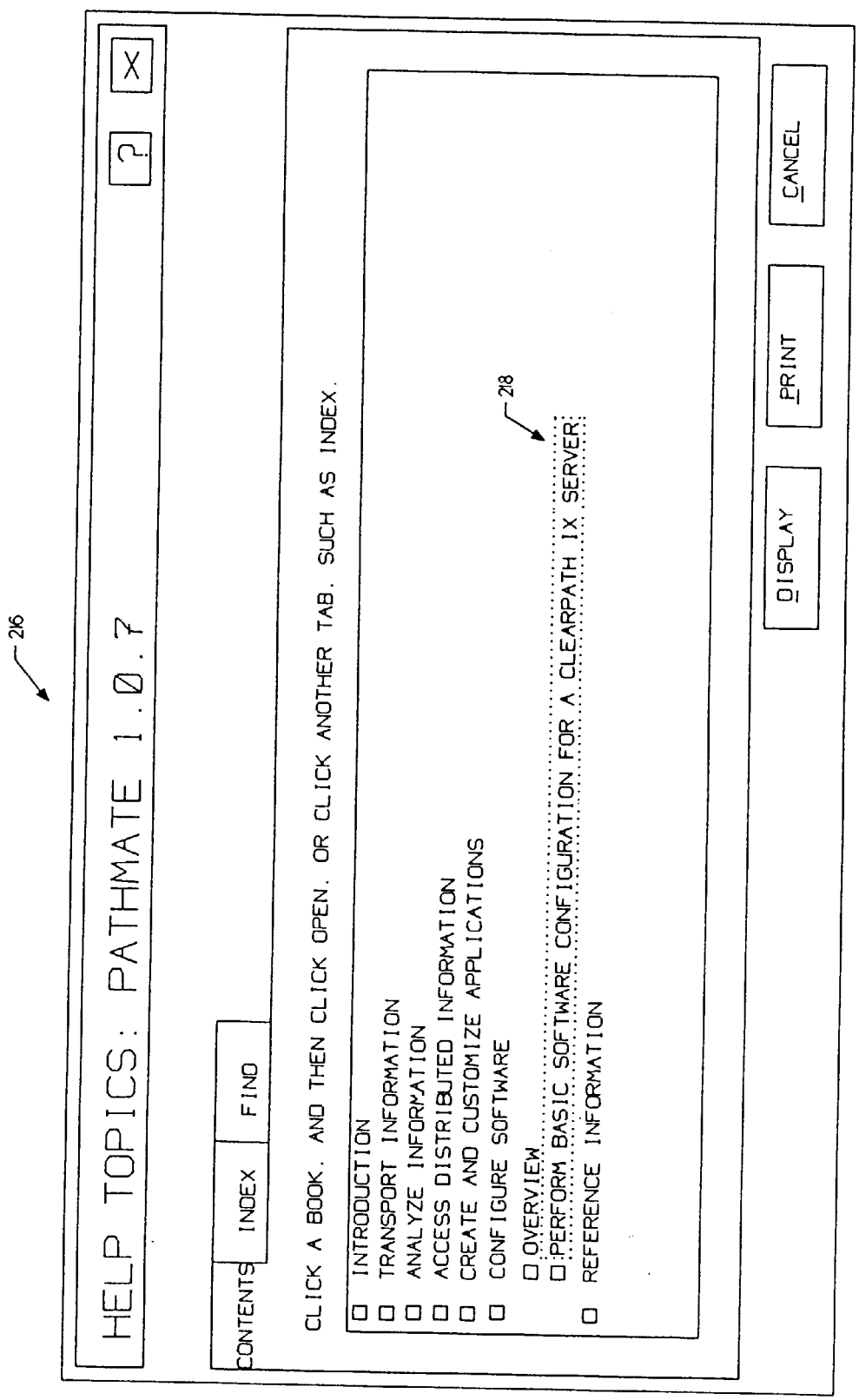
FIG. 15A is a view of the window of the preferred embodiment showing selection of a seventh solution.

FIG. 15A is a view of window 216 which provides the user with assistance to configure the basic software of a ClearPath HMP IX server. The ClearPath HMP IX server, available from Unisys Corporation, provides a heterogeneous environment that includes both a large scale Unisys mainframe computer platform and an Intel (Unix or NT) platform. The assistance provided by this applet permits the user of an industry compatible desk top or lap top computer platform to configure the ClearPath server, communications, print, OPE, and open transaction manager. The user initiates the assistance functions by highlighting line 218 as shown.

Figure 15B:
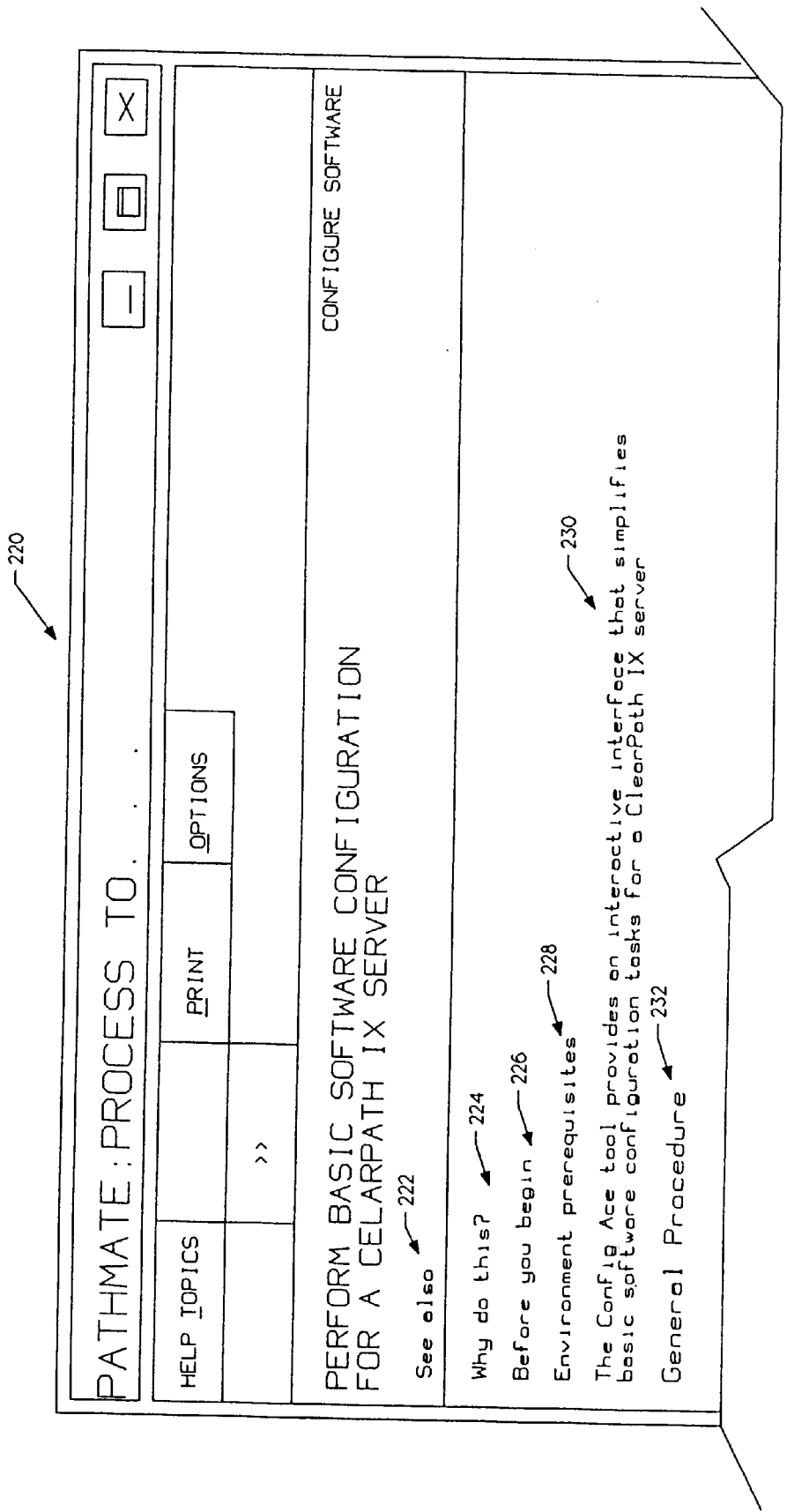
FIG. 15B is a view of the detailed assistance window for configuration of ClearPath.

FIG. 15B is a view of window 220 offering the detailed assistance in configuring the ClearPath IX server. The standard format hypertext labels 222, 224, 226, and 228 offer the user related, ancillary information. Helpful hint 230 directly references the Config Ace tool (see below). The general procedures are given beginning at line 232.

Figure 16:
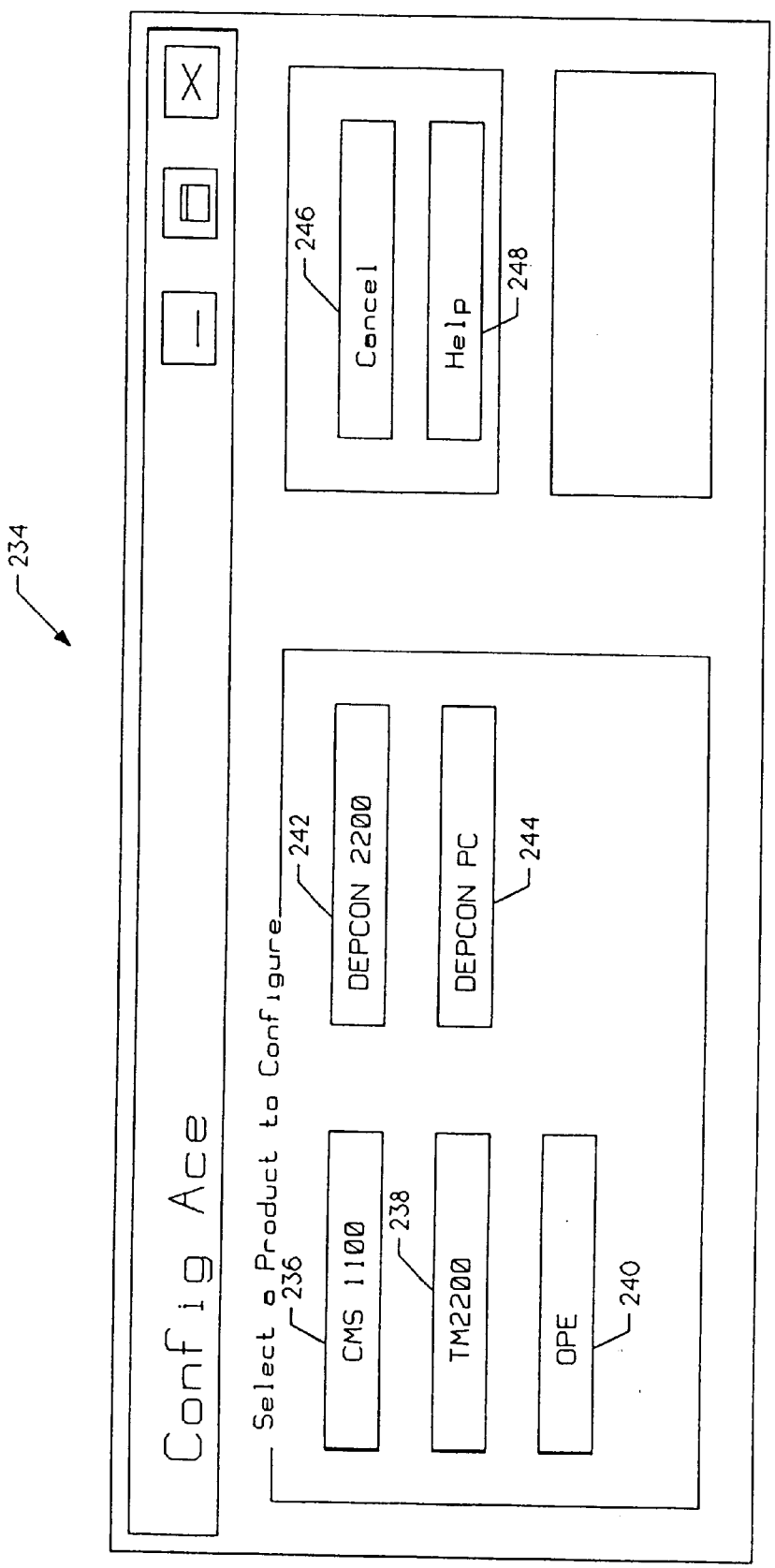
FIG. 16 is a view of the window of the preferred embodiment showing operation of the configuration function.

FIG. 16 is a view of window 234 which provides access to the Config Ace tool. As discussed above (see also FIG. 1), this tool is a relatively high level of assistance which automatically performs major functions on behalf of the user. Clicking button 236 automatically configures ClearPath IX for the CMS 1100 environment. Similarly, clicking button 238 configures it for the OLTP-TM 2200 environment. Button 240 provides the opportunity to configure the Open Programming Environment (OPE). Buttons 242 and 244 offer configuration of alternative print queue and file management control schemes. Clicking button 246 cancels the process, whereas clicking button 248 provides additional information regarding the procedure.

Figure 17:
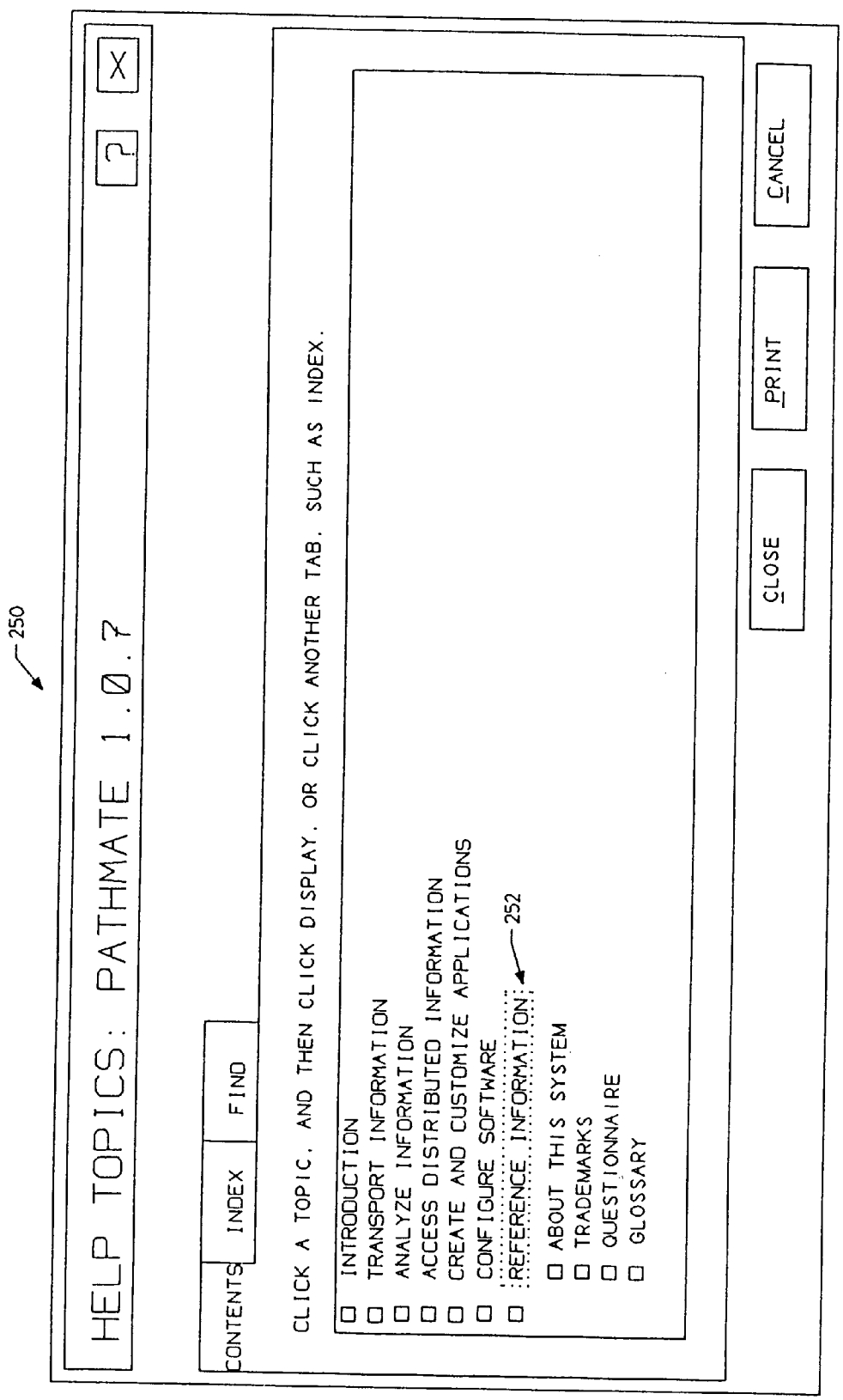
FIG. 17 is a view of view of the window of the preferred embodiment showing standard help access.

FIG. 17 is a view of window 250 offering the user access to information regarding various ancillary information. The user highlights line 252 as shown to begin access to this information. The available assistance is categorized as:
1. About This Help System;
2. Trademarks;
3. Questionnaire; and
4. Glossary.

As can be appreciated, these topics are of a more general nature and are primarily useful as background information for the user.

Having thus described the preferred embodiment of the present invention, those of skill in the art will readily appreciate the many additional embodiments that may be implemented using the teachings found herein and within the scope of the claims hereto attached and wherein we claim:

We claim:

1. A method for providing help information to a single user of a computer system, wherein the computer system includes at least two separately executable software products thereon, the method comprising the steps of:
   a. providing help information for a first one of the at least two software products in a help database;
   b. providing help information for a second one of the at least two software products regarding interoperability of said first one and said second one of at least two software products in the help database; and
   c. ensuring that said providing step a. and said providing step b. are performed by a single copy of said help database.

2. A method according to claim 1 further comprising the step of:
   a. providing help information on how to incorporate data from the second software product into the first software product.

3. A method according to claim 1 wherein the first and second software products are provided by different software vendors.

4. A method according to claim 1 wherein the first and second software products are resident in different computer platforms.

5. A method for providing help information to a user of a computer system via a help tool executing on the computer system, the method comprising the steps of:
   a. providing help information on how to perform a number of selected tasks involving a plurality of application programs;
   b. allowing the user to select one of the number of selected tasks, thereby resulting in a selected task; and
   c. automatically performing the selected task.

6. In a help system that operates on a computer system, the help system comprising:
   a. interface means for allowing a user to access the help system via a general help call and via executing a desired help applet; and
   b. diagram means for selectively displaying selected help information in a diagram form via the interface means.

7. In a data processing system that includes at least one executable software product having a corresponding help file, the improvement comprising:
   a demonstration applet associated with said at least one executable software product and said corresponding help file, wherein said demonstration applet demonstrates to a user, a portion of the operation of said at least one executable software product.

8. In a data processing system according to claim 7 having a second separately executable software product, the improvement comprising:

a second demonstration applet associated with said second separately executable software product which is accessed via said corresponding help file and demonstrates to said user a portion of the operation of said second separately executable software product.

9. An apparatus comprising:

a. a data processing system having a plurality of interconnected computer platforms;

b. a first software product executable on a first one of said plurality of interconnected computer platforms;

c. a second software product executable on a second one of said plurality of interconnected computer platforms; and d. a help facility executable on said plurality of interconnected computer platforms which describes the interoperability of said first software product and said second software product.

10. An apparatus according to claim 4 wherein said first software product and said second software product are supplied by different vendors.

11. An apparatus according to claim 4 wherein said help facility further comprises an animation presentation program for displaying the description of interoperability of said first software product and said second software product in animated form on a computer output device.

12. An apparatus according to claim 4 wherein said help facility further comprises an applet for describing how to transfer data from said first software product to said second software product.

13. An apparatus according to claim 12 wherein said help facility further comprises a link to execute said selected one of said plurality of help topics.

14. An apparatus according to claim 4 wherein said help facility further comprises a selector for selecting one of a plurality of help topics.

* * * * *

UNITED STATES PATENT AND TRADEMARK OFFICE
CERTIFICATE OF CORRECTION

PATENT NO.   : 5,917,485
DATED        : June 29, 1999
INVENTOR(S)  : Spellman et al.

It is certified that error appears in the above-identified patent and that said Letters Patent is hereby corrected as shown below:

Column 10,
Line 55, thereof, after "allowing" delete "a" and insert -- the --
Line 59, thereof, delete "interface" and insert therefor -- help --

Column 12,
Line 1, thereof, delete "4" and insert therefor -- 9 --
Line 4, thereof, delete "4" and insert therefor -- 9 --
Line 9, thereof, delete "4" and insert therefor -- 9 --
Line 16, thereof, delete "4" and insert therefor -- 9 --.

Signed and Sealed this

Twenty-fourth Day of December, 2002

JAMES E. ROGAN
*Director of the United States Patent and Trademark Office*